(12) United States Patent
Gerritsen et al.

(10) Patent No.: US 7,118,621 B2
(45) Date of Patent: Oct. 10, 2006

(54) ORGANO-FUNCTIONAL POLYSILOXANES

(75) Inventors: Roy Gerritsen, Almere (NL); Sibel Mill, Riemerling (DE); Michel Gillard, Louvain-la-Neuve (BE); Gerard De Vries, Amsterdam (NL)

(73) Assignee: Sigmakalon Services B.V., Uithoorn (NL)

( * ) Notice: Subject to any disclaimer, the term of this patent is extended or adjusted under 35 U.S.C. 154(b) by 39 days.

(21) Appl. No.: 10/512,903

(22) PCT Filed: Apr. 30, 2003

(86) PCT No.: PCT/EP03/04512

§ 371 (c)(1),
(2), (4) Date: May 18, 2005

(87) PCT Pub. No.: WO03/093350

PCT Pub. Date: Nov. 13, 2003

(65) Prior Publication Data

US 2005/0202257 A1    Sep. 15, 2005

(30) Foreign Application Priority Data

May 3, 2002    (EP) .................................. 02447082

(51) Int. Cl.
*C09D 183/06* (2006.01)
*C09D 183/07* (2006.01)
*C09D 183/08* (2006.01)
*C07F 7/08* (2006.01)
*C08G 77/18* (2006.01)
*C08G 77/26* (2006.01)
*C08G 77/28* (2006.01)

(52) U.S. Cl. ............................ 106/287.13; 106/287.11; 106/287.12; 106/287.14; 106/287.15; 549/215; 525/474; 525/476; 528/26; 528/27; 528/28; 528/29; 428/429; 428/447; 427/427.4; 427/427.5; 427/427.6; 427/429; 427/430.1; 427/443.2; 427/435; 427/440

(58) Field of Classification Search ........... 106/287.11, 106/287.12, 287.13, 287.14, 287.15; 549/215; 525/474, 476; 528/26, 27, 28, 29
See application file for complete search history.

(56) References Cited

U.S. PATENT DOCUMENTS

| | | | |
|---|---|---|---|
| 5,187,251 A | 2/1993 | Jachmann et al. | |
| 5,248,789 A | * 9/1993 | Wolff | .......................... 549/215 |
| 6,344,520 B1 | 2/2002 | Greene | |

FOREIGN PATENT DOCUMENTS

| | | |
|---|---|---|
| DE | 42 16 923 | 11/1993 |
| DE | 42 34 959 | 4/1994 |
| EP | 0 430 102 | 6/1991 |

* cited by examiner

*Primary Examiner*—David M. Brunsman
(74) *Attorney, Agent, or Firm*—Knobbe, Martens, Olson & Bear, LLP

(57) ABSTRACT

The present invention relates to an organo-functional polysiloxane of formula (1) wherein each $R^1$ is independently selected from alkyl or aryl radicals, each $R^2$ is independently selected from hydrogen, alkyl or aryl radicals, n is selected so that the molecular weight for the organo-functional polysiloxane is in the range of from 400 to 10,000, $R^3$ is a bivalent radical or —O—W—$(X)_z$ is hydroxy or alkoxy, z is 1, 2 or 3 and X is a reactive functional group for reacting with amine radicals and wherein 0 to 90% of —O—$R_3$—$(X)_z$ is hydroxy or alkoxy

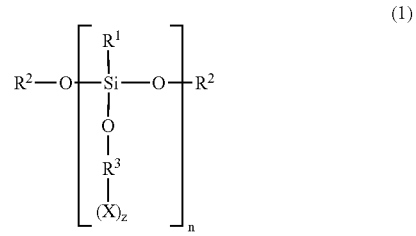

(1)

43 Claims, No Drawings

ORGANO-FUNCTIONAL POLYSILOXANES

RELATED APPLICATIONS

This application is the U.S. National Phase under 35 U.S.C. § 371 of International Application PCT/EP03/04512, filed Apr. 30, 2003, which claims priority of EP 02447082.5, filed May 3, 2002.

FIELD OF THE INVENTION

This invention relates to new organo-functional polysiloxanes useful as resins. This invention also relates to the use of these organo-functional polysiloxanes in resin based compositions useful for protective coatings and the like, having improved properties of flexibility, weatherability, compressive strength, chemical and mechanical resistance. This invention yet further relates to coating compositions comprising said organo-functional polysiloxanes and to methods of preparation thereof.

BACKGROUND

Polysiloxanes are known to give interesting properties as resins and coatings. True advancements in the state-of-the-art for protective coatings require substantial improvements in weathering (primarily ultraviolet resistance), heat resistance, chemical resistance and corrosion control. Polysiloxane chemistry offers the potential for providing many of these advancements. Polysiloxane is defined as a polymer consisting of repeating silicon-oxygen atoms in the backbone that imparts several advantages over previously used carbon-based polymer binders; one of these advantages being an enhanced chemical and thermal resistance due to the silicon-oxygen bond. Polysiloxane's polymer linkage is also transparent to ultraviolet light making it resistant to ultraviolet degradation. Finally, polysiloxane is not combustible and is resistant to a wide range of chemicals and solvents, including acids.

Functional polysiloxanes have been described. U.S. Pat. No. 4,413,104 to Wacker describes a process for preparing organo-functional polysiloxanes such as amino-functional polysiloxanes and copolymers thereof. These organo-functional polysiloxanes possess a Si—C bond between the polymeric polysiloxane backbone and the functional linking arm. WO 01/09261 describes coating compositions comprising as component functional polysiloxanes comprising reactive functional groups.

It is an object of the present invention to provide new organo-functional polysiloxanes, which can be prepared with a simple method. It is another object to introduce functional groups on a polysiloxane backbone, which are reactive with amine radicals. It is yet another object of the present invention to provide new coating compositions comprising said organo-functional polysiloxanes with improved hardness development without impairing chemical, mechanical and weathering resistance.

SUMMARY OF THE INVENTION

In a first aspect of the present invention, novel organo-functional polysiloxanes of formula (1) are described, wherein each $R^1$ is independently selected from the group comprising alkyl and aryl radicals, each $R^2$ is independently selected from the group comprising hydrogen, alkyl and aryl radicals, n is selected so that the molecular weight for the organo-functional polysiloxane is in the range of from 400 to 10,000, $R^3$ is a bivalent radical or —O—$R^3$—$(X)_z$ is hydroxy or alkoxy, z is 1, 2 or 3 and X is a reactive functional group for reacting with amine radicals and wherein 0 to 90% of —O—$R^3$—$(X)_z$ is hydroxy or alkoxy. Said organo-functional polysiloxane possess a Si—O—C bond between the polymeric backbone and the functional group.

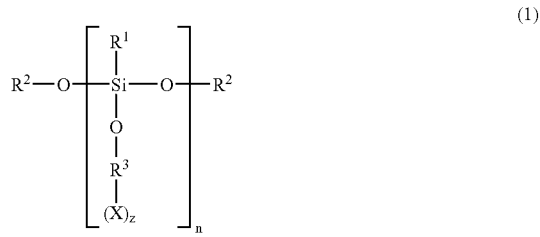

(1)

According to an embodiment, the organo-functional polysiloxane of formula (1) has preferably the following stoichiometric formula

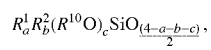

wherein each $R^{10}$ is independently selected from hydrogen, alkyl, or —$R^3$—$(X)_z$, and $R^1$, $R_2$, $R_3$, X and z have the same meaning as that defined above, a and b are each a real number from 0.0 to 2.0, more in particular from 0.1 to 2.0, c is a real number from 0.1 to 1.0, b/a is ranging from 0.2–2.0 and a+b+c is lower than 4, and wherein 0 to 90% of —O—$R^{10}$ is hydroxy or alkoxy.

More in particular the present invention relates to organo-functional polysiloxane wherein the reactive functional group X for reacting with amine radicals is selected from the group comprising unsaturated ester, imidyl, phthalimidyl, cyclocarbonate, acetylalkanoate, acetylalkylamide, epoxy, cyclic anhydride, carbamate, isocyanate, vinyl, oxetane.

In a second aspect, the present invention relates to a method for the preparation of organo-functional polysiloxane of formula (1). The present invention further relates to the use of said organo-functional polysiloxane as resins and in a coating.

In a third aspect, the present invention provides new coating compositions comprising said organo-functional polysiloxane of formula (1) and to a method of preparation thereof. Said coatings show improved hardness development.

The present invention provides furthermore methods having the advantage of being a simple one step synthesis of said organo-functional polysiloxane from available polysiloxane. The present invention also allows the introduction of a great variety in the structure and in the concentration of the functional groups into polysiloxane, which make said organo-functional polysiloxane reactive towards conventional amino-hardeners.

DETAILED DESCRIPTION

The present invention relates to organo-functional polysiloxanes of formula (1) wherein each $R^1$ is independently selected from the group comprising alkyl and aryl radicals, each $R^2$ is independently selected from the group comprising hydrogen, alkyl and aryl radicals, n is selected so that the molecular weight for the organo-functional polysiloxane is in the range of from 400 to 10,000, $R^3$ is a bivalent radical or —O—$R^3$—$(X)_z$ is hydroxy or alkoxy, z is 1, 2 or 3 and X is a reactive functional group for reacting with amine radicals and wherein 0 to 90% of —O—$R^3$—$(X)_z$ is hydroxy or alkoxy.

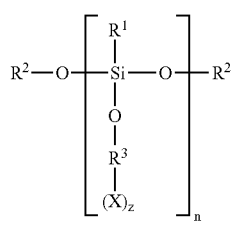

(1)

It is to be understood that formula (1) is illustrative only, and that the organo-functional polysiloxane according to the invention may contain from 0 to 90% of alkoxy or hydroxy radicals.

As used herein, the term "Independently selected" Indicates that the each radical R so described, can be identical or different. For example, each $R^1$ in compound of formula (1) may be different for each value of n.

As used herein "a real number" refers to a number, which is positive and includes integers and fractions of integers or any rational or irrational number. For example a is a real number from 0.0 to 2.0 means that a may assume any value within the range from 0.0 to 2.0.

The term "alkenyl", alone or in combination, defines straight and branched chained hydrocarbon radicals containing from 2 to about 18 carbon atoms, preferably from 2 to 8 carbon atoms, more preferably 2–6 carbon atoms containing at least one double bond such as, for example, ethenyl, propenyl, butenyl, pentenyl, hexenyl and the like.

The term "alkenylene", alone or in combination, defines bivalent straight and branched chained hydrocarbon radicals containing from 2 to about 18 carbon atoms, preferably from 2 to 8 carbon atoms, more preferably 2–6 carbon atoms containing at least one double bond such as, for example, ethenylene, propenylene, butenylene, pentenylene, hexenylene and the like.

The term "alkoxy" or "alkyloxy", alone or in combination, means alkyl ether radical wherein the term alkyl is as defined above. Examples of suitable alkyl ether radicals include methoxy, ethoxy, n-propoxy, isopropoxy, n-butoxy, iso-butoxy, sec-butoxy, tert-butoxy, hexanoxy and the like.

The term "alkyl", alone or in combination, means straight and branched chained saturated hydrocarbon radicals containing from 1 to 10 carbon atoms, preferably from 1 to 8 carbon atoms, more preferably 1–6 carbon atoms. Examples of such radicals include methyl, ethyl, n-propyl, isopropyl n-butyl, isobutyl, sec-butyl, tert-butyl, 2-methylbutyl, pentyl, iso-amyl, hexyl, 3-methylpentyl, octyl and the like.

The term "alkylene", alone or in combination, defines bivalent straight and branched chained saturated hydrocarbon radicals containing from 1 to 10 carbon atoms, preferably from 1 to 8 carbon atoms, more preferably 1–6 carbon atoms such as, for example, methylene, ethylene, propylene, butylene, pentylene, hexylene and the like.

The term "alkynyl", alone or in combination, defines straight and branched chained hydrocarbon radicals having from 2 to 10 carbon atoms containing at least one triple bond, more preferably from 2 to about 6 carbon atoms.

Examples of alkynyl radicals include ethynyl, propynyl, (propargyl), butane, pentynyl, hexynyl and the like.

The term "aminoalkylene" means a bivalent alkylene amine radical, wherein the term "alkylene" is defined as above. Examples of aminoalkylene radicals include aminomethylene (—$CH_2NH$—), aminoethylene (—$CH_2CH_2NH$—), aminopropylene, aminoisopropylene, aminobutylene, aminoisobutylene, aminohexylene and the like.

The term "aralkyl" alone or in combination, means an alkyl as defined herein, wherein an alkyl hydrogen atom is replaced by an aryl as defined herein. Examples of aralkyl radicals include benzyl, phenethyl, dibenzylmethyl, methylphenylmethyl, 3-(2-naphthyl)-butyl, and the like.

The term "aralkylene" as used herein, relates to a group of the formula alkylene-arylene in which alkylene is as defined above. Examples of aralkylene radicals include benzylene, phenethylene and the like.

The term "aryl" alone or in combination, is meant to include phenyl and naphtyl which both may be optionally substituted with one or more substituents independently selected from alkyl, alkoxy, halogen, hydroxy, amino, nitro, cyano, haloalkyl, carboxy, alkoxycarbonyl, cycloalkyl, heterocycle, amido, optionally mono- or disubstituted aminocarbonyl, methylthio, methylsulfonyl, and phenyl optionally substituted with one or more substituents selected from alkyl, alkyloxy, halogen, hydroxy, optionally mono- or disubstituted amino, nitro, cyano, haloalkyl, carboxyl, alkoxycarbonyl, cycloalkyl, heterocycle, optionally mono- or disubstituted aminocarbonyl, methylthio and methylsulfonyl; whereby the optional substituents on any amino function are independently selected from alkyl, alkyloxy, heterocycle, heterocycloalkyl, heterocyclooxy, heterocyclooxyakyl, phenyl, phenyloxy, phenyloxyalkyl, phenylalkyl, alkyloxycarbonylamino, amino, and aminoalkyl whereby each of the amino groups may optionally be mono- or where possible di-substituted with alkyl. Examples of aryl includes phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl and the like.

The term "arylene" as used herein, includes a bivalent organic radical derived from an aromatic hydrocarbon by removal of two hydrogen, such as phenylene.

The term "cycloalkyl" alone or In combination, means a saturated or partially saturated monocyclic, bicyclic or polycyclic alkyl radical wherein each cyclic moiety contains from about 3 to about 8 carbon atoms, more preferably from about 3 to about 7 carbon atoms. Examples of monocyclic cycloalkyl radicals include cyclopropyl, cyclobutyl, cyclopentyl, cyclohexyl, cycloheptyl, cyclodecyl and the like. Examples of polycyclic cycloalkyl radicals include decahydronaphthyl, bicyclo [5.4.0] undecyl, adamantyl, and the like.

The term "cycloalkylalkyl" means an alkyl radical as defined herein, in which at least one hydrogen atom on the alkyl radical is replaced by a cycloalkyl radical as defined herein. Examples of such cycloalkylalkyl radicals include cyclopropylmethyl, cyclobutylmethyl, cyclopentylmethyl, cyclohexylmethyl, 1-cyclopentylethyl, 1-cyclohexylethyl, 2-cyclopentylethyl, 2-cyclohexylethyl, cyclobutylpropyl, cyclopentylpropyl, 3-cyclopentylbutyl, cyclohexylbutyl and the like.

The term "haloalkyl" alone or in combination, means an alkyl radical having the meaning as defined above wherein one or more hydrogens are replaced with a halogen, preferably, chloro or fluoro atoms, more preferably fluoro atoms. Examples of such haloalkyl radicals include chloromethyl, 1-bromoethyl, fluoromethyl, difluoromethyl, trifluoromethyl, 1,1,1-trifluoroethyl and the like.

As used herein, the term "halo" or "halogen" as a group or part of a group is generic for fluoro, chloro, bromo or iodo.

The term "heterocycle" alone or in combination, is defined as a saturated or partially unsaturated or aromatic monocyclic, bicyclic or polycyclic heterocycle having preferably 3 to 12 ring members, more preferably 5 to 10 ring members and more preferably 5 to 8 ring members, which contains one or more heteroatom ring members selected from nitrogen, oxygen or sulfur and which is optionally substituted on one or more carbon atoms by alkyl, alkyloxy, halogen, hydroxy, oxo, optionally mono- or disubstituted amino, nitro, cyano, haloalkyl, carboxyl, alkoxycarbonyl, cycloalkyl, optionally mono- or disubstituted aminocarbonyl, methylthio, methylsulfonyl, aryl and a saturated or partially unsaturated or aromatic monocyclic, bicyclic or tricyclic heterocycle having 3 to 12 ring members which contains one or more heteroatom ring members selected from nitrogen, oxygen or sulfur and whereby the optional substituents on any amino function are independently selected from alkyl, alkyloxy, heterocycle, heterocycloalkyl, heterocyclo-oxy, heterocyclo-oxyalkyl, aryl, aryloxy, aryloxyalkyl, aralkyl, alkyloxycarbonylamino, amino, and aminoalkyl whereby each of the amino groups may optionally be mono- or where possible di-substituted with alkyl.

The term "heterocycloalkyl" means alkyl as defined herein, wherein an alkyl hydrogen atom is replaced by a heterocycle as defined herein. Examples of heterocycloalkyl radicals include 2-pyridylmethyl, 3-(4-thiazolyl)-propyl, and the like.

As used herein, the term (C═O) forms a carbonyl moiety with the carbon atom to which it is attached.

The term "alkylthio" means an alkyl thioether radical, wherein the term "alkyl" is defined as above. Examples of alkylthio radicals include methylthio ($SCH_3$), ethylthio ($SCH_2CH_3$), n-propylthio, isopropylthio, n-butylthio, isobutylthio, sec-butylthio, tert-butylthio, n-hexylthio, and the like.

According to an embodiment of the present invention, the bivalent radical $R^3$ is selected from the group comprising alkylene, alkenylene, arylene, aralkylene, aralkenylene, aryloxy, aminoalkylene, —C(═O)—, —C(═S)—, —S(═O)$_2$—, alkylene-C(═O)—, alkylene-C(═S)—, alkylene-S(═O)$_2$—, —NR$^4$—C(═O)—, —NR$^4$-alkylene-C(═O)—, or —NR$^4$—S(═O)$_2$ whereby either the C(═O) group or the S(═O)$_2$ group is attached to the NR$^4$ moiety, optionally substituted by alkyl, aryl, cycloalkyl, halogen, hydroxy, alkoxy, thioalkyl, amino, amino derivatives, amido, amidoxy, nitro, cyano, keto, acyl derivatives, acyloxy derivatives, carboxy, ester, ether, esteroxy, sulfonic acid, sulfonyl derivatives, sulfinyl derivatives, heterocycle, alkenyl or alkynyl, wherein $R^4$ is hydrogen, alkyl, alkenyl, aralkyl, cycloalkyl, cycloalkylalkyl, aryl, heterocycle or heterocycloalkyl; or the radical —O—R$^3$—(X)$_z$ can be selected from the group comprising hydroxy, alkoxy or radical of formula (I), (II), (III), (IV), (V), (VI), (VII), (VIII), (IX) wherein $R^6$ is H or

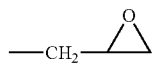

and m is an integer from 0 to 10.

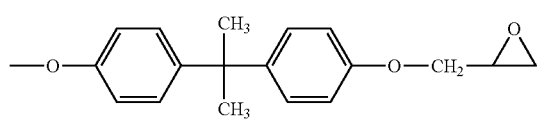

(I)

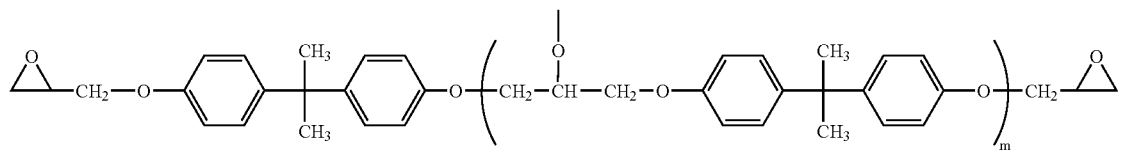

(II)

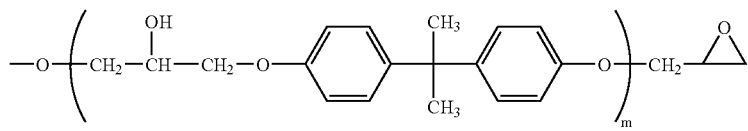

(III)

(IV)

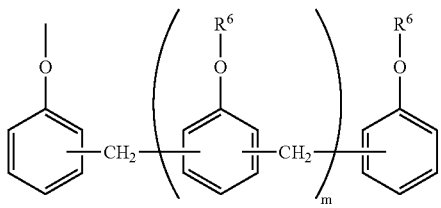

(IX)

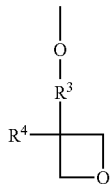

(V)

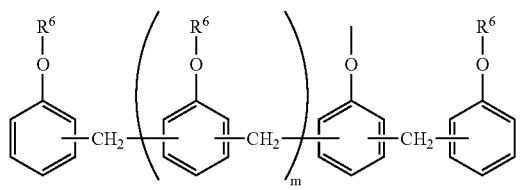

(VI)

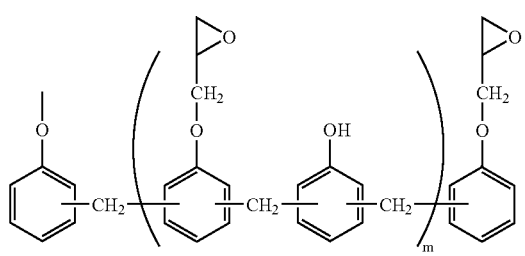

(VII)

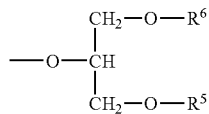

(VIII)

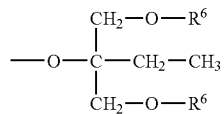

More in particular the present invention relates to organofunctional polysiloxane wherein said reactive functional group X for reacting with amine radicals is selected from the group comprising unsaturated ester, imidyl, phthalimidyl, cyclocarbonate, acetylalkanoate, acetylalkylamide, epoxy, cyclic anhydride, carbamate, isocyanate, vinyl, oxetane.

Non-limiting examples of reactive functional group X include acrylate, methacrylate, maleimide, succinimide, glycerolcarbonate, acetylacetanoate, epoxy, (cyclic)succinic anhydride, phthalic anhydride, isocyanate, oxetane and vinyl.

More in particular the functional group $-R^3(X)_z$ is selected from the group comprising acrylate, methacrylate, maleimide, succinimide, glycerolcarbonate, acetylacetanoate, cyclic succinic anhydride and phthalic anhydride.

According to another embodiment the present invention relates to organo-functional polysiloxane having the following formulas (a), (b), (c), (d), (e), (f), (g), (h), (i), (j), (k), (l), (m)

(a)

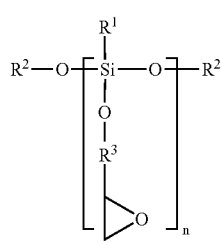

(b)

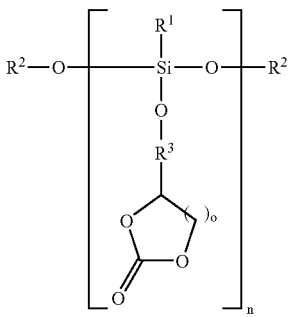

(c)

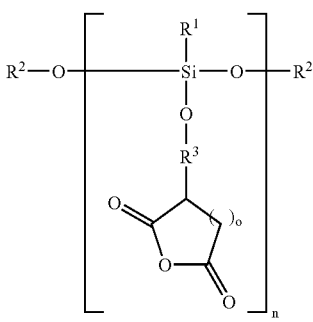

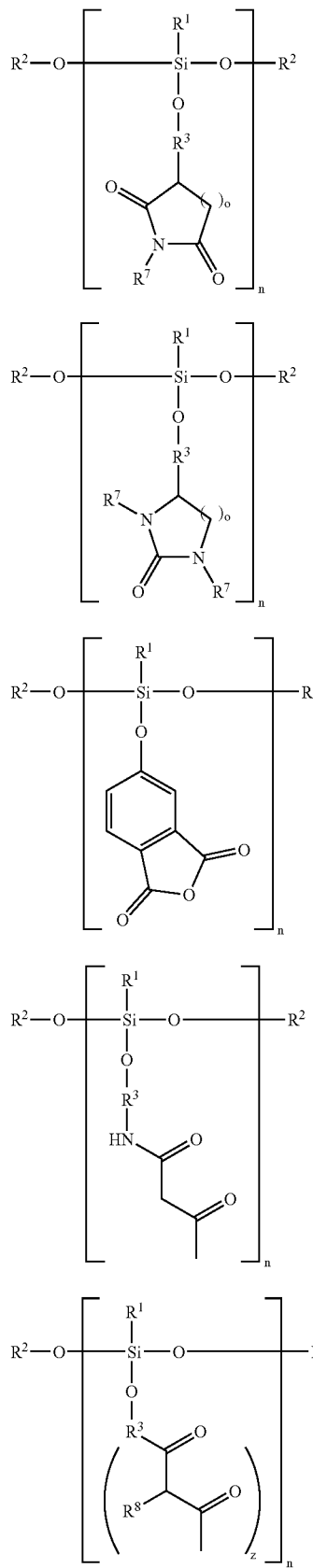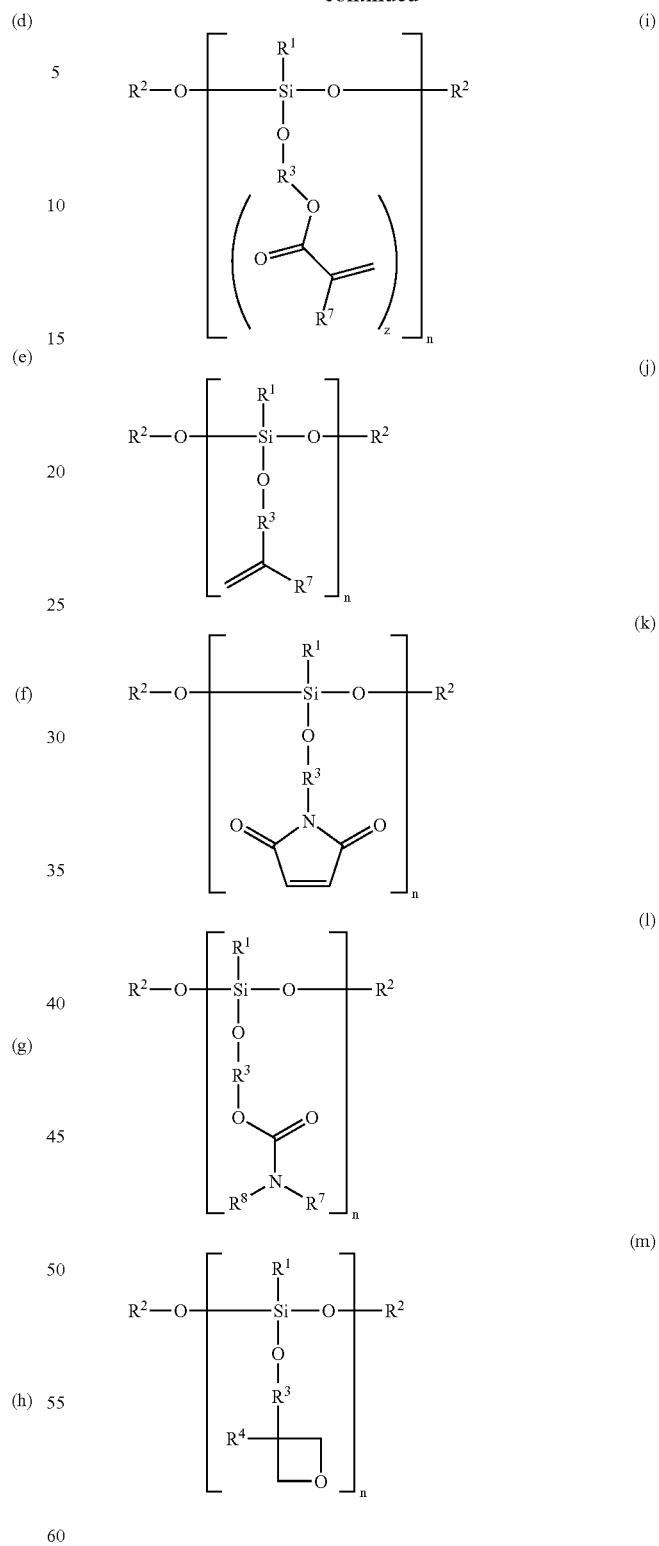
wherein $R^1$, $R^2$, $R^3$ and n have the same meaning as that defined above, $R^7$, $R^8$, $R^4$ represent each independently a hydrogen, alkyl, alkenyl, aralkyl, cycloalkyl, cycloalkylalkyl, aryl, heterocycle or heterocycloalkyl, z is 1, 2 or 3 and o is 1, 2 or 3. It is to be understood that formula (a), (b), (c), (d), (e), (f), (g), (h), (i), (j), (k), (l), (m) are illustrative only, and that the organo-functional polysiloxane according to the invention as illustrated above may contain from 0 to 90% of alkoxy or hydroxy radicals.

Non-limiting examples of organo-functional polysiloxane according to the invention include those listed in Table 1.

According to another aspect, the present invention relates to a method for the preparation of organo-functional polysiloxane of formula (1) as described above. Said method comprises the step of reacting a polysiloxane of formula (2) with a compound of formula (3), optionally in the presence of a suitable catalyst,

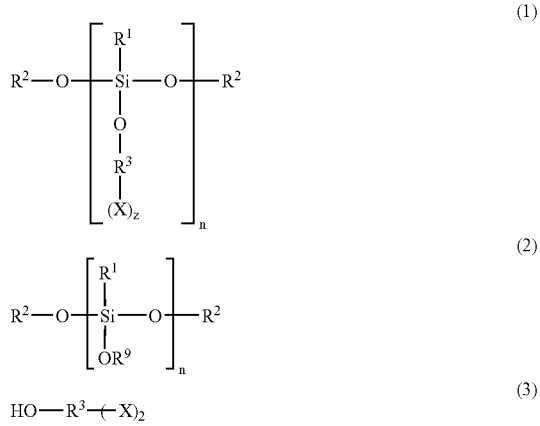

wherein each $R^1$ is independently selected from the group comprising alkyl and aryl radicals, $R^2$ and $R^9$ which may be identical or different, are selected each independently from the group comprising hydrogen, alkyl and aryl radicals, n is selected so that the molecular weight for the polysiloxane is in the range of from 400 to 10,000, $R^3$ is a bivalent radical or —O—$R^3$—(X)$_z$ in compound of formula (1) is hydroxy or alkoxy, z is 1, 2 or 3 and X is a reactive functional group for reacting with amine radicals and wherein 0 to 90% of —O—$R^3$—(X)$_z$ in compound of formula (1) is hydroxy or alkoxy.

The presence of a catalyst is optional. The catalyst may, for example, be an inorganic acid such as hydrochloric acid, nitric acid, sulfuric acid or phosphoric acid, an organic acid such as acetic acid, paratoluenesulfonic acid, benzoic acid, phthalic acid, maleic acid, formic acid or oxalic acid, an alkaline catalyst such as potassium hydroxide, sodium hydroxide, calcium hydroxide or ammonia, an organic metal, a metal alkoxide, an organic tin compound such as dibutyltin dilaurate (DBTL), dibutyltin dioctiate or dibutyltin diacetate, or a boron compound such as boron butoxide or boric acid. Illustrative examples of metal alkoxide include aluminum triethoxide, aluminum triisopropoxide, aluminum tributoxide, aluminum tri-sec-butoxide, aluminum diisopropoxy-sec-butoxide, aluminum diisopropoxyacetylacetonate, aluminum di-sec-butoxyacetylacetonate, aluminum diisopropoxyethylacetoacetate, aluminum di-sec-butoxyethylacetoacetate, aluminum trisacetylacetonate, aluminum trisethylacetoacetate, aluminum acetylacetonate bisethylacetoacetate, titanium tetraethoxide, titanium tetraisopropoxide, titanium (IV) butoxide, titanium tetrabutoxide, titanium (IV) n-butoxide, titanium diisopropoxybisacetyl acetonate, titanium diisopropoxybisethyl acetoacetate, titanium tetra-2-ethylhexyloxide, titanium diisopropoxybis(2-ethyl-1,3-hexanediolate), titanium dibutoxybis(triethanolaminate), zirconium tetrabutoxide, zirconium tetraisopropoxide, zirconium tetramethoxide, zirconium tributoxide monoacetylacetonate, zirconium dibutoxide bisacetylacetonate, zirconium butoxide trisacetylacetonate, zirconium tetraacetylacetonate, zirconium tributoxide monoethylacetoacetate, zirconium dibutoxide bisethylacetoacetate, zirconium butoxide trisethylacetoacetate and zirconium tetraethylacetoacetate. In addition to these compounds, cyclic 1,3,5-triisopropoxycyclotrialuminoxane and the like can also be used. Among these compounds, aluminum truisopropoxide, aluminum tri-sec-butoxide, aluminum diisopropoxyethylacetoacetate, aluminum di-sec-butoxyethylacetoacetate, aluminum trisacetylacetonate, titanium tetraisopropoxide, titanium tetrabutoxide and zirconium tetrabutoxide are used preferably, when necessary.

According to an embodiment, the polysiloxane of formula (2) has the following stoichiometric formula

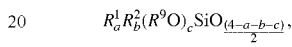

wherein $R^1$, $R^2$, $R^9$ have the same meaning as that defined above, a and b are each a real number from 0.0 to 2.0, more in particular from 0.1 to 2.0, c is a real number from 0.1 to 1.0, b/a is ranging from 0.2–2.0 and a+b+c is lower than 4.

Suitable polysiloxane of formula (2) may have a molecular weight ranging from 500 to 6000 and an alkoxy content ranging from 10 to 50%.

Examples of suitable polysiloxane of formula (2) include but are not limited to the alkoxy- and silanol-functional polysiloxanes. Suitable alkoxy-functional polysiloxanes include, but are not limited to: DC-3074 and DC3037 from Dow Corning; Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DC-431 HS silicone resins and DC-Z-6018 intermediate and Rhodia Silicones' Rhodorsil Resin 6407 and 6482 X.

In order to obtain said organo-functional polysiloxane of formula (1), polysiloxane starting material of formula (2) may be reacted with any suitable polyfunctional compound of formula (3) comprising at least one hydroxyl and at least one functional group X susceptible to react with amine group. Said reaction may be partial or total, and the organo-functional polysiloxane obtained at the end of the reaction may contain from 0 to 90% of alkoxy or hydroxy radicals.

For example, suitable compounds of formula (3) include but are not limited to compounds of formulas (a'), (b'), (c'), (d'), (e'), (f'), (g'), (h'), (i'), (j'), (k'), (l'), (I'), (II'), (III'), (IV'), (V'), (VI'), (VII'), (VIII'), (IX') wherein $R^3$ has the same meaning as that defined above, wherein $R^6$ is H or

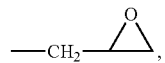

m is an integer of 0 to 10, $R^7$, $R^8$, $R^4$ represent each independently a hydrogen, alkyl, alkenyl, aralkyl, cycloalkyl, cycloalkylalkyl, aryl, heterocycle or heterocycloalkyl, z is 1, 2 or 3 and o is 1, 2 or 3.

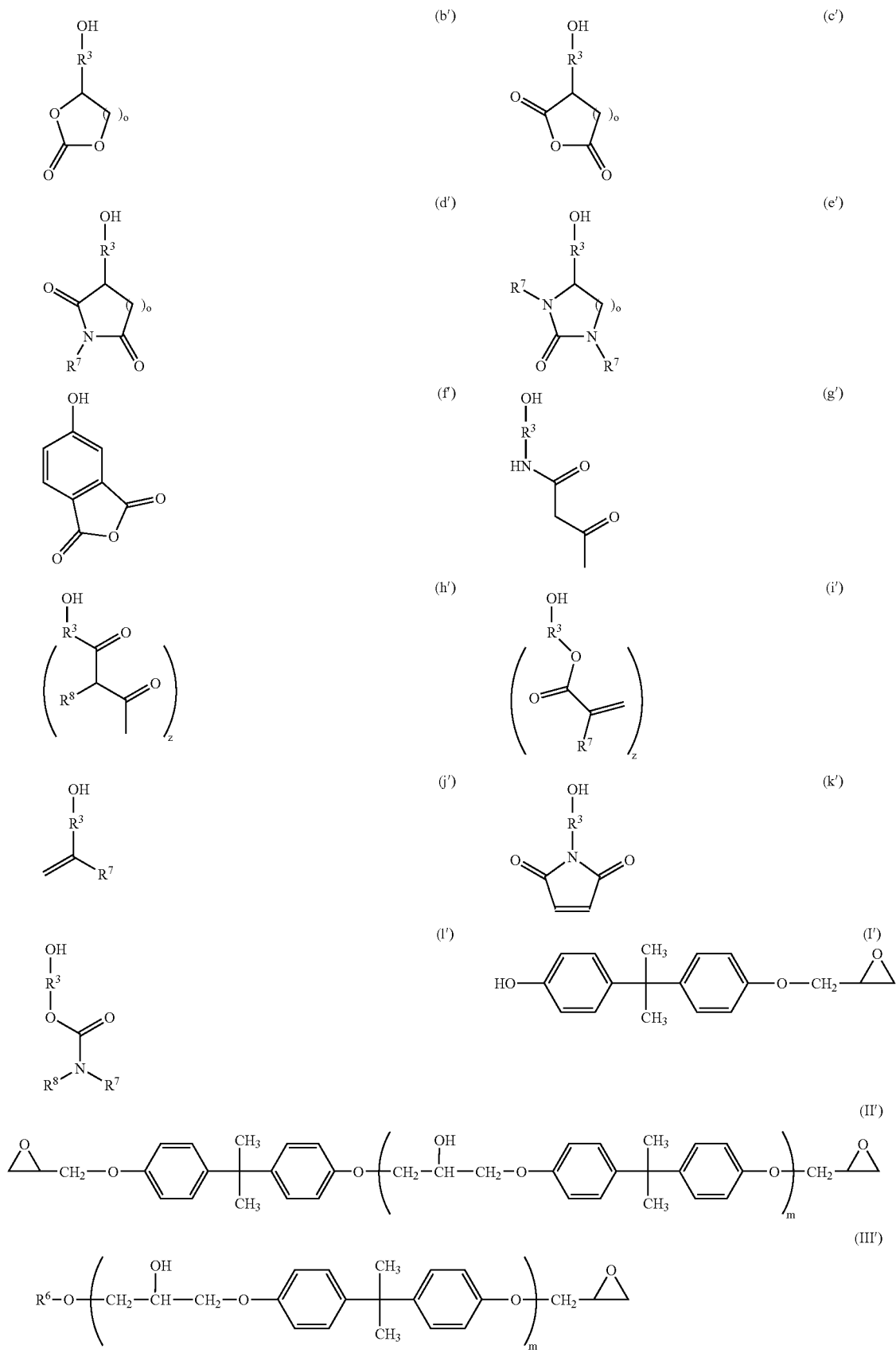

-continued

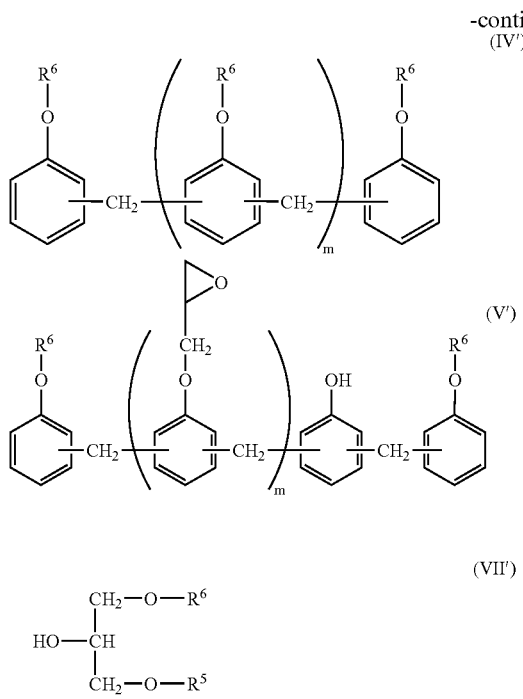

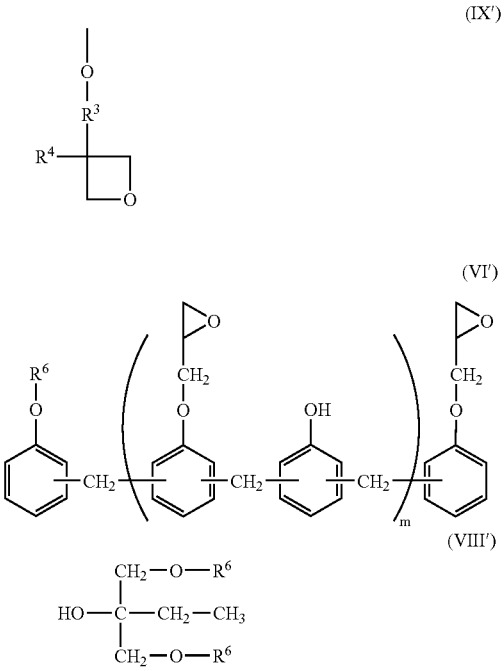

For example, compound of formula (3) may be any suitable epoxy resin. Said suitable epoxy resins for reaction with polysiloxane of formula (2) may be produced by the attachment of an epoxide group to both ends of a paraffinic hydrocarbon chain (for example, diepoxides derived from butanediol) or of a polyether chain, such as α-ω-diepoxy polypropylene glycol. More exotic diepoxy resins suitable for said reaction include but are not limited to vinylcyclo hexene dioxide, 3,4-epoxycyclohexylmethyl 3,4-epoxycyclohexanemono carboxylate, 3-(3,4-epoxycyclohexyl)-8,9-epoxy-2,4-dioxaspiro-[5.5]undecane, bis(2,3-epoxycyclopentyl) ether, bis(3,4-epoxy-6-methylcyclohexyl) adipate and resorcinol diglycidyl ether. Other suitable epoxy resins can contain more than two epoxide functional groups per molecule, such as epoxidized soya oils, polyglycidyl ethers of phenolic resins of the novolak type, p-aminophenoltriglycidyl ether or 1,1,2,2-tetra(p-hydroxyphenyl)ethane tetraglycidyl ether. Another class of epoxy resins suitable for reaction with the polysiloxane of formula (2), comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e. bisphenol A; bis(4-hydroxyphenyl)-1,1-isobutane, 4,4-dihydroxybenzophenone; bis (4-hydroxyphenyl-1,1-ethane; bis(2-hydroxynaphenyl)-methane; and 1,5-hydroxynaphthalene. One very common polyepoxide is a polyglycidyl ether of a polyphenol, such as bisphenol A. Another class of epoxy resin suitable for the reaction comprises the hydrogenated epoxy resin based on bisphenol A such as Eponex 1510 from Shell. Other examples of suitable epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexane-triol, glycerol, trimethylolpropane, and bis(4-hydroxycyclohexyl)-2,2-propane. A detailed list of suitable epoxide compounds which can be used for the synthesis the organo-functional polysiloxane according to the invention can be found in the handbooks A. M. Paquin, "Epoxidverbindungen und Harze" (Epoxide Compounds and Resins), Springer Verlag, Berlin 1958, Chapter IV and H. Lee and K. Neville, "Handbook of Epoxy Resins" MC Graw Hill Book Company, New York 1982 Reissue, as well as C. A. May, "Epoxy Resins-Chemistry and Technology", Marcel Dekker, Inc. New York and Basle, 1988.

According to another embodiment, more suitable compounds of formula (3) may be selected form the group comprising glycerin carbonate, trimethylolpropane oxetane (TMPO), hydroxyethylacrylate, hydroxyethylmethacrylate, Epikote 834, Epikote 1001, epoxidized phenol, formaldehyde resins, bakelite LA647, glycidyl ethers of polyol such as trimethylpropane (TMP) and neopentyl glycol (NPG), glycerol and the like, such as araldite T or diglycidyl ether of glycerol.

According to yet another aspect, the present invention relates to the use of an organo-functional polysiloxane according to the invention as resins.

The present invention also relates to the use of an organo-functional polysiloxane as described above in a coating.

The present invention further relates to a coating composition comprising an organo-functional polysiloxane according to the Invention, an amino-hardener and optionally an epoxy resin. The coating composition can include these organo-functional polysiloxane in an amount ranging from 40 to 80% by weight, or for example in an amount ranging from 40 to 70% by weight and for example in an amount ranging from 40 to 60% by weight.

More in particular, the coating composition can include the organo-functional polysiloxane according to the invention is an amount ranging from 40 to 80% by weight and the amino-hardener in an amount ranging from 20 to 60% by weight.

Examples of conventional amino-hardener include but are not limited to aliphatic, cycloaliphatic amine, aromatic, araliphatic amines, imidazoline group-containing polyaminoamides based on mono or polybasic acids, as well as adducts thereof. These compounds are part of the general state of the art and are described, inter alia, in Lee & Neville, "Handbook of Epoxy Resins", MC Graw Hill Book Company, 1987, chapter 6-1 to 10-19.

More in particular, useful amino-hardener include polyamines distinguished by the fact that they carry at least two primary amino groups, in each case bonded to an aliphatic carbon atom. It can also contain further secondary or tertiary amino groups. Suitable polyamines include polyaminoamides (from aliphatic diamines and aliphatic or aromatic dicarboxylic acids) and polyiminoalkylene-diamines and polyoxyethylene-polyamines, polyoxypropylene-polyamines and mixed polyoxyethylene/polyoxypropylene-polyamines, or amine adducts, such as amine-epoxy resin adducts. Said amines may contain 2 to 40 carbon atoms. For examples, the amines can be selected from polyoxyalkylene-polyamines and polyiminoalkylene-polyamines having 2 to 4 carbon atoms in the alkylene group, and have a number-average degree of polymerization of 2 to 100, other examples of amines can be linear, branched or cyclic aliphatic primary diaminoalkanes having 2 to 40 carbon atoms. In addition, said amines can be araliphatic amines having at least two primary amino groups, each of which are bonded to an aliphatic carbon atom.

The coating composition can include these amino-hardener in an amount ranging from 20 to 60% by weight, or for example in an amount ranging from 30 to 55% by weight and for example in an amount ranging from 40 to 60% by weight.

Examples of suitable polyamines include: 1,2-diaminoethane, 1,2-diaminopropane, 1,3-diaminopropane, 1,4-diaminobutane and higher homologues, as well as 2-methyl-1,5-diaminopentane, 1,3diaminopentane, 2,2,4-trimethyl-1,6-diaminohexane and 2,4,4-trimethyl-1,6-diaminohexane as well as industrial mixtures thereof, 1-amino-3-aminomethyl-3,5,5-trimethylcyclohexane, 2,2-dimethyl-1,3-diaminopropane, 1,3-bis(aminomethyl)cyclohexane, 1,2-diaminocyclohexane, 1,3-bis(aminomethyl)benzene, bis(4-aminocyclohexyl)methane, bis(4-amino-3-methylcyclohexyl)methane, 3-azapentane-1,5-diamine, 4-azaheptane-1,7-diamine, 3,6-diazaoctane-1,8-diamine, benzyloxypropylaminepropylamine, diethylamino-propylamine, 3(4),8(9)-bis(aminomethyl)tricyclo-[5.2.1.0$^{2,6}$]decane, 3-methyl-3-azapentane-1,5-diamine, 3,6-dioxaoctane-1,8-diamine, 3,6,9-trioxaundecane-1,11-diamine, 4,7-dioxadecane-1,10-diamine, 4,7,10-trioxatridecane-1,13-diamine, 4-aminomethyl-1,8-diaminooctane, 2-butyl-2-ethyl-1,5-diaminopentane, 3-(aminomethyl)benzylamine (MXDA), 5-(aminomethyl)bicyclo[2.2.1]hept-2-yl]methylamine (NBDA), polyamino imidazoline (Versamid 140), as well as diethylenetriamine (DETA), triethylenetetramine (TETA, which is a mixture of several polyamines), pentaethylenetetramine, dimethyldipropylenetriamine, dimethylaminopropyl-aminopropylamine (DMAPAPA), N-2-(aminoethyl)piperazine (N-AEP), N-(3-aminopropyl)piperazine, norbornane diamine, epilink MX, isophoronediamine (IPD), diaminodicyclohexylmethane (PACM), dimethyldiaminodicyclohexyl methane (Laromin C260), tetramethylhexamethylenediamine (TMD), bis aminomethyl-dicyclopentadiene (tricyclodecyldiamine, TCD), diaminocyclohexane, diethylaminopropylamine (DEAPA), and the like. In addition, mixtures from several amines are possible.

Suitable polyamine could be polyoxyalkylenepolyamine hardener, such as for example, polyoxyalkylene polyamine hardener of formula (4)

$$[H_2N—(R^aCHCH_2O)_x]_yQ \qquad (4)$$

wherein Q is the residue of an active hydrogen-containing polyvalent compound; each $R^a$ is independently hydrogen or alkyl; x is at least 1; and y is at least 2, provided that the average value for x is less than 10 for the low molecular weight polyoxyalkylene polyamine used.

The variables in said formula have the following meanings: Q is the residue of an active hydrogen-containing polyvalent compound used as an initiator. The valence of Q is given by y, wherein y is at least 2, preferably from 2 to 8, and most preferably 2 to 3. Each $R^a$ is independently hydrogen or alkyl, such as methyl or ethyl. The $R^a$ groups are preferably hydrogen and/or methyl, including mixtures. The average number of oxyalkylene repeating units per amine group, given by x, is at least 1, preferably from 1 to 100, and most preferably from 1.5 to 7. Preferably Q is residual alkyl, alkenyl, alkynyl, most preferably $C_{1-18}$ alkyl.

Typical oxyalkylene repeating units include oxyethylene, oxypropylene, oxybutylene, and so on, including mixtures thereof. When two or more oxyalkylenes are used, they may be present in any form, such as randomly or in blocks.

Examples of suitable polyoxyalkylene polyamine are polyoxyalkylenetriamines and polyoxyalkylenediamine. Examples of suitable polyoxyalkylenepolyamine are polyoxypropylenetriamine and polyoxypropylenediamine. Non-limiting examples of polyoxyalkylene polyamines include JEFFAMINE polyoxyalkylene amines from HUNTSMAN, such as diamines D-230, D-400, D-2000 and D-4000, and triamines T-403, T-3000 and T-5000. Suitable polyiminoalkylenepolyamines are also available, for example, under the trade name ®Polymin. According to a preferred embodiment the polyoxyalkylene polyamines are JEFFAMINE® T-403 (Huntsman) or JEFFAMINE® D230. In addition, mixtures from several amines are possible.

Several suitable polyoxyalkylene polyamines and their preparations are described in U.S. Pat. Nos. 5,391,826 and 4,766,245 hereby incorporated by reference.

Suitable epoxy resins that can be optionally added to the coating composition are the same as those described above.

If appropriate, the coating composition according to the invention may additionally comprise a diluent which is inert. Examples of suitable diluents include aliphatic linear, branched or cyclic ethers having 4 to 20 carbon atoms and mixed aliphatic-aromatic ethers having 7 to 20 carbon atoms, such as dibenzyl ether, tetrahydrofuran, 1,2-dimethoxyethane or methoxybenzene; aliphatic linear, branched or cyclic or mixed aliphatic-aromatic ketones having 4 to 20 carbon atoms, such as butanone, cyclohexanone, methyl isobutyl ketone or acetophenone; aliphatic linear, branched or cyclic or mixed aromatic-aliphatic alcohols having 4 to 20 carbon atoms, such as methanol, ethanol, butanol, 2-propanol, isobutanol, isopropanol, benzyl alcohol, methoxypropanol or furfuryl alcohol; aliphatic linear, branched or cyclic or mixed aromatic-aliphatic esters such as methoxypropylacetate or DBE (dibasic esters from Dupont, mixture of dimethyl adipate, succinate and glutarate); aliphatic linear, branched or cyclic or mixed aromatic-aliphatic hydrocarbons such as toluene, xylene, heptane and mixtures of aliphatic and aromatic hydrocarbons having a boiling range above 100° C. under normal pressure, as well as low-viscosity coumarone-indene resins or xylene-formaldehyde resins. Aliphatic alcohols having one phenyl radical, such as benzyl alcohol, 1-phenoxypropane-2,3-diol, 3-phenyl-1-propanol, 2-phenoxy-1-ethanol, 1-phenoxy-2-propanol, 2-phenoxy-1-propanol, 2-phenylethanol, 1-phenyl-1-ethanol or 2-phenyl-1-propanol, are preferred. The diluents can be employed Individually or as a mixture, and in particular in a amount ranging from 1 to 35% by weight, for example in an amount ranging from 5 to 25% by weight and for example in an amount ranging from 10 to 30%.

The coating composition may also contain auxiliaries or additives such as pigments or filler ingredients, solvents, colorants, mineral oils, fillers, elastomers, antioxidants, stabilizers, defoamers, extenders, rheological modifiers, plasticizers, thixotropic agents, adhesion promoters, catalysts, pigment pastes, reinforcing agents, flow control agents, thickening agents, flame-retarding agents, additional hardeners and additional curable compounds, depending on the application.

Suitable pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition is understood to vary, depending on the particular composition application, and can be zero when a clear composition is desired. For example a coating composition may comprise up to 50% by weight fine particle size pigment and/or filler. Depending on the particular end use, a preferred coating composition may comprise approximately 25% by weight fine particle size filler and/or pigment.

The presence of water during curing of said coating composition plays a role and can be an important requirement. The sources of water can be mainly atmospheric humidity and adsorbed moisture on the pigment or filler material. Additional water may be added to accelerate cure of said coating composition depending on ambient conditions. Other sources of water may include trace amounts present in the amino hardener, thinning solvent, or other ingredients that could be added to said composition.

Curing of said coating composition according to the invention typically can proceed very rapidly, and in general can take place at a temperature within the range of from −10° C. to +50° C., in particular from 0° C. to 40° C., more in particular from 3 to 20° C.

The present invention further relates to a method for the preparation of a coating composition as described above, comprising the step of mixing a organo-functional polysiloxane according to the invention, with an amino-hardener such as those described above and optionally a catalyst.

Examples of suitable catalysts for said method are described above. Up to 10% by weight catalyst may be added to the coating composition, or may be added as an entirely separate component, to speed drying and curing of the coating composition. As described above useful catalysts include metal driers well known in the paint industry, e.g. zinc, manganese, zirconium, titanium, cobalt, iron, lead and tin containing driers. Suitable catalysts include organotin catalysts. For example, dibutyl tin dilaurate, dibutyl tin diacetate, organotitanates, sodium acetate, and aliphatic secondary or tertiary polyamines including propylamine, ethylamino ethanol, triethanolamine, triethylamine, and methyl diethanol amine may be used alone or in combination.

Other suitable catalysts include acids such as organic acids, inorganic acids, organic sulfonic acids, esters of sulfuric acid and superacids. Organic acids include acetic acid, formic acid and the like. Inorganic acids include sulfuric acid, hydrochloric acid, perchloric acid, nitric acid, phosphoric acid, and the like. Organic sulfonic acids include both aromatic and aliphatic sulfonic acids. Representative sulfonic acids that are commercially available include methanesulfonic, trifluoromethanesulfonic, benzenesulfonic, dodecylbenzenesulfonic, dodecyidiphenyloxide sulfonic, 5-methyl-1-naphthylenesulfonic, and p-toluenesulfonic acid, sulfonated polystyrene, and the sulfonates derived from polytetrafluoroethylenes. Superacids suitable as catalysts are described in G. A. Olah, G. K. S. Prakash, and J. Sommer, Superacids, John Wiley & Sons: New York, 1985. Useful superacids include perchloric, fluorosulfuric, trifluoromethanesulfonic, and perfluoroalkylsulfonic acids. They also include Lewis superacids such as $SbF_5$, $TaF_5$, $NbF_5$, $PF_5$, and $BF_3$. Superacids also include hydrogen fluoride in combination with fluorinated Lewis acids such as $SbF_5$, $TaF_5$, $NbF_5$, $PF_5$, and $BF_3$. They also include oxygenated Bronsted acids such as sulfuric, fluorosulfuric, trifluoromethanesulfonic, and perfluoroalkylsulfonic acid in combination with Lewis acids such as $SbF_5$, $TaF_5$, $NbF_5$, $PF_5$, and $BF_3$.

Other examples of suitable catalysts include nitrate of a polyvalent metal ion such as calcium nitrate, magnesium nitrate, aluminum nitrate, zinc nitrate, or strontium nitrate.

The present invention further relates to an organo-functional polysiloxane polymer composition obtainable by combining the following ingredients:

an organo-functional polysiloxane according to the invention with, optionally an epoxy resin having more than one 1,2-epoxy groups per molecule with an epoxy equivalent weight in the range of from 100 to about 5,000;

optionally a polysiloxane, and a sufficient amount of an amino hardener component, as described above having active hydrogens able to react with the functional groups in the organo-functional polysiloxane to form polymers.

Examples of suitable epoxy resins for the organo-functional polysiloxane polymer coating composition are the same as that described above. Suitable epoxy resins include but are not limited to non-aromatic diglycidyl ethers of cyclohexane dimethanol, bisphenol A diglycidyl ether, hydrogenated bisphenol A diglycidyl ether (DGEBA) type epoxy resins, such as Heloxy 107, Eponex 1510 and 1513 from Resolution performance products; Erisys GE-22, Epalloy 5000 and 5001 from CVC Specialty Chemicals; Polypox R11 from UPPC GmbH; Epo Tohto ST-1000 and ST-3000 from Tohto Kasei; Epodil 757 from Air Products; and Araldite DY-C and DY-T from Vantico.

Other suitable non-aromatic epoxy resins include DER 732 and 736 from Dow Chemical; Heloxy 67, 68, 48, 84, 505 and 71 each from Resolution Performance Products; Erisys GE-20, GE-21, GE-23, GE-30, GE-31 and GE-60 from CVC Specialty Chemicals; Polypox R3, R14, R18, R19, R20 AND R21 from UPPC GmbH; aliphatic epoxy resins such as Araldite DY-T, DY-C and DY-0397 from Vantico; ERL4221 from Union Carbide; and Aroflint 607 from Reichold Chemicals and bisphenol F diglycidyl ether type epoxy resin such as Epikote 862 from Resolution Performance Products and hydrogenated bisphenol F diglycidyl ether type epoxy resin such as Rüftapox VE4261/R from Rutgers Bakelite.

Examples of suitable polysiloxane for the organo-functional polysiloxane polymer composition include the polysiloxane of formula (2) described above. With respect to the polysiloxane used to make up the base component, preferred polysiloxanes include, but are not limited to, those having the following formula (5):

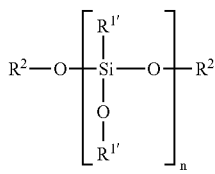

(5)

wherein each $R^{1'}$ is independently selected from the group comprising hydroxy, alkyl, aryl and alkoxy radicals, and $R^2$ and n have the same meaning as that defined above.

This organo-functional polysiloxane polymer composition may also contain auxiliaries or additives such as pigments or filler ingredients, solvents, colorants, mineral oils, fillers, elastomers, antioxidants, stabilizers, defoamers, extenders, plasticizers, catalysts, pigment pastes, reinforcing agents, flow control agents, thickening agents, flame-retarding agents, additional hardeners and additional curable compounds, depending on the application.

The new polymer compositions of the present invention are suitable as binders for coatings having good film forming properties, drying behavior and exhibit better performance than blends of polysiloxane and epoxies. The functionalities of the organo-functional polysiloxanes can be adapted through synthesis to obtain the necessary linking. The new polymer compositions of the present invention can be supplied as a two components system. One system would contain the binder comprising the organo-functional polysiloxane of this invention, optionally a pigment, additives and solvent if desired, and the second system would contain the hardener and optionally a catalyst.

The coating compositions according to the invention can find various industrial applications because of their favorable properties such as fast curing time, rapid drying, even at low temperatures and even under high atmospheric humidity. Typical industrial applications for said compositions include, for example, use for the production of shaped articles (casting resins) for tool construction, or for the production of coatings and/or intermediate coatings on many types of substrates, for example, on those of an organic or inorganic nature, such as textiles of natural or synthetic origin, plastics, glass, ceramic and building materials, such as concrete, fiberboards and artificial stones, but in particular on metals, such as optionally pretreated sheet steel, cast iron, aluminum and nonferrous metals, such as brass, bronze and copper. The coating compositions according to the invention can furthermore be employed as constituents of adhesives, putties, laminating resins and synthetic resin cements, and in particular as constituents of paints and coatings for coating industrial objects, domestic appliances and furniture and in the shipbuilding industry, land storage tanks and pipelines and in the building industry, such as, for example, refrigerators, washing machines, electrical appliances, windows and doors.

They can be applied, for example, by brushing, spraying, dipping and the like. A particularly preferred field of use for the composition according to the invention is paints formulations.

The invention will be more readily understood by reference to the following examples and figures, which are included merely for purposes of illustration of certain aspects and embodiments of the present invention and are not intended to limit the invention.

EXAMPLES

Examples 1 to 7 describe the synthesis of some organo-functional polysiloxanes according to the invention Example 8 shows examples of coating compositions, and organo-functional polysiloxane polymer compositions according to the invention. The Koenig hardness of said polymers is further measured. The Koenig hardness (ISO1522 and DIN53157) is a pendulum-damping test for assessment of the hardness of a coating. A pendulum of particular shape and time of oscillation rests on two balls on the paint film and is set into motion from a certain starting deflection angle (from 6° to 3°). The time in which the pendulum has arrived at a certain final angle is a measurement for the hardness of the film. The harder the coated surface, the higher the number of oscillations. The number of oscillations is then converted in seconds.

Example 9 gives examples of organo-functional polysiloxanes according to the invention.

Example 1

Cyclocarbonate-modified Polysiloxane 37.8 g of glycerin carbonate (Jeffsol GC, Huntsman) are added to 83.3 g of polysiloxane resin Silres SY231 (Wacker) in a reaction vessel under nitrogen atmosphere equipped with a mechanical stirrer, a distilling column and a condenser. 0.07 g of titanium (IV) butoxide is added. The mixture is then heated at 160° C. during 6 hours. The last volatile alcohols formed during reaction are then removed by applying vacuum. The mixture is then diluted with butyl acetate to a solid content of 80%. The modified polysiloxane has a MW of 2643 and a polydispersity of 2.57 (determined by GPC). NMR analysis showed that 9% GC is free, the conversion of the MeO groups is 91.1%, and the butoxy groups is 55.4%.

Example 2

Cyclocarbonate-modified Polysiloxane 33.8 g of glycerin carbonate (Jeffsol GC, Huntsman) are added to 83.3 g of polysiloxane resin Silres SY231 (Wacker) in a reaction vessel under nitrogen atmosphere equipped with a mechanical stirrer, a distilling column and a condenser. 0.07 g of titanium (IV) butoxide is added. The mixture is then heated at 160° C. during 6 hours. The last volatile alcohols formed during reaction are then removed by applying vacuum. The mixture is then diluted with butyl acetate to a solid content of 80%. The modified polysiloxane has a MW of 2210 and a polydispersity of 4.54 (determined by GPC). NMR analysis showed that 8.5% GC is free and the conversion of the MeO groups is 79.1% and the butoxy groups is 38.2%.

Example 3

Cyclocarbonate-modified Polysiloxane 120 g of glycerin carbonate (Jeffsol GC, Huntsman) are added to 333.2 g of polysiloxane resin Silres SY231

(Wacker) in a reaction vessel under nitrogen atmosphere equipped with a mechanical stirrer, a distilling column and a condenser. 0.28 g of titanium (IV) butoxide is added. The mixture is then heated at 160° C. during 6 hours. The last volatile alcohols formed during reaction are then removed by applying vacuum. The mixture is then diluted with butyl acetate to a solid content of 80%. The modified polysiloxane has a MW of 2790 and a polydispersity of 2.31 (determined by GPC). NMR analysis showed that less than 1% GC is free; the conversion of the MeO groups is 81.4% and the butoxy groups is 45%.

Example 4

Acrylate-modified Polysiloxane 304 g of polysiloxane resin DC3074 (Dow Corning) are added to 81.2 g of hydroxyethylacrylate in 64 g Shellsol D40 (Shell) in a reaction vessel equipped with a mechanical stirrer, a distilling column and a condenser. 0.8 g of methylhydroquinone and 1.9 g of titanium (IV) butoxide are added. The mixture is then heated at 140° C. during 2 hours. The mixture is then diluted with Shellsol D40 to a solid content of 76.2%. The free OHEA-content is 1.6% (measured by gas chromatography). The molecular weight measured by GPC (Gel permeation chromatography) is (Mw) 2985 and the polydispersity is 2.1. The acrylic weight equivalent is 642 g/eq. The free OHEA content is measured by GC and is 1.6% w:w, the calculated conversion is 94%.

Example 5

Epoxy-modified Polysiloxane 663.7 g of Epikote 834 (Resolution) in 165.9 g of xylene are added to 261.3 g of polysiloxane resin Silres SY231 (Wacker) in a reaction vessel under nitrogen atmosphere equipped with a mechanical stirrer, a distilling column and a condenser. 0.9 g of titanium (IV) butoxide is added. The mixture is then heated at 140° C. during 1 hour. The last volatile alcohols formed during reaction are then removed by applying vacuum. The mixture is then diluted with xylene to a solid content of 85.15%. The Haake viscosity at 23° C. is 34 dPa.s and the epoxy value (in solution) is 2148 mmole/kg. The molecular weight measured by GPC (Gel permeation chromatography) is (Mw) 3236 and the polydispersity is 6.4. NMR analysis showed that the conversion of the MeO groups is 60.8% and the butoxy groups is 8.1%.

Example 6

Epoxy-modified Polysiloxane (OH-functional)

300 g of Epikote 834 (Resolution Performance Products), 75 g xylene, 160 g Silres SY300 (Wacker) and 1 g of heptanoic acid are mixed in a reaction vessel under nitrogen atmosphere equipped with a mechanical stirrer, a Dean-Stark column and a condenser. The mixture is gradually heated at 200° C. until the end of distillation of water (5 ml water are distilled). The MW is 8815 and polydispersity is 15.7. The resin is in solution in xylene and has a solid content of 82.1% and an epoxy value (in solution) of 2110 mmole epoxy/kg.

Example 7

Oxetane-modified Polysiloxane 116.6 g of trimethylolpropane oxetane (TMPO, Perstorp) are added to 333.2 of polysiloxane resin Silres SY231 (Wacker) in a reaction vessel under nitrogen atmosphere equipped with a mechanical stirrer, a distilling column and a condenser. 0.6 g of titanium (IV) butoxide is added. The mixture is then heated at 165° C. during 3 hours while methanol is distilled off. The last volatile alcohols formed during reaction are then removed by applying vacuum. The Haake viscosity at 23° C. is 12.4 dPa.s. The molecular weight measured by GPC (Gel permeation chromatography) is (Mw) 2052 and the polydispersity is 3.8.

Example 8

Film Preparation and Hardness Measurements

TABLE A

|  | Film 1 | Film 2 | Film 3 | Film 4 | Film 5 | Film 6 |
| --- | --- | --- | --- | --- | --- | --- |
| Example 5 | 46.85 |  |  | 34.20 |  |  |
| Example 3 |  | 46.65 |  |  | 34.27 |  |
| Example 4 |  |  | 46.60 |  |  | 34.24 |
| Eponex 1510 |  |  |  | 11.40 | 11.43 | 11.41 |
| NBDA | 3.15 | 3.35 | 3.40 | 4.40 | 4.30 | 4.35 |
| Koenig-hardness |  |  |  |  |  |  |
| 1 day | 42 | 2 | Nm | 92 | Nm | 6 |
| 2 days | 50 | 5 | 3 | 110 | 6 | 6 |
| 7 days | 66 | 12 | 6 | 112 | 9 | 7 |
| 14 days | 84 | 17 | 12 | 117 | 130 | 12 |

Nm: not measured. (film still tacky)

Table A shows the hardness development of films according to the Invention cured with an aliphatic diamine 5-(aminomethyl)bicyclo[[2.2.1]hept-2-yl]methylamine (NBDA). These results show that with or without epoxy resin, the organo-functional polysiloxanes according to the invention react with amino-hardener and form films with good hardness development.

TABLE B

|  | Film 9 | Film 10 | Film 11 | Film 12 | Film 13 | Film 14 |
| --- | --- | --- | --- | --- | --- | --- |
| Example 5 | 30.24 |  |  | 21.84 |  |  |
| Example 3 |  | 30.45 |  |  | 21.94 |  |
| Example 4 |  |  | 30.35 |  |  | 21.89 |
| Eponex 1510 |  |  |  | 7.28 | 7.30 | 11.41 |
| T403 | 4.76 | 4.55 | 4.65 | 5.88 | 5.81 |  |
| Koenig-hardness |  |  |  |  |  |  |
| 1 day | 6 | 4 | Nm | 6 | Nm | Nm |
| 2 days | 22 | 8 | Nm | 32 | 5 | Nm |
| 7 days | 81 | 17 | 2 | 52 | 12 | 7 |
| 14 days | 112 | 35 | 3 | 155 | 17 | 9 |

Table B shows the hardness development of films according to the invention cured with an aliphatic triamine, which is a slow curing amine. These results show that even with slow curing amine, the organo-functional polysiloxane according to the invention give films with low to very good hardness development.

TABLE C

| Film | \multicolumn{8}{c}{Clear formulations (100% stoichiom.):} | | | | | | | |
|---|---|---|---|---|---|---|---|---|
| | I | II | III | IV | V | VI | VII | VIII |
| Eponex 1510 | 25 | 25 | | 25 | 15 | 15 | | 15 |
| DC 3074 | 35 | 35 | 35 | | 21 | 21 | 21 | |
| Example 6 | | 10 | 25 | 25 | | 6 | 15 | 15 |
| DBTL | 2 | 2 | 2 | 1 | 1.2 | 1.2 | 1.2 | 0.6 |
| Xylene | | | | 2.5 | | | | 2.25 |
| T 403 | 9.33 | 11.04 | 14.27 | 13.6 | | | | |
| Commercial aminopolysiloxane | | | | | 17.07 | 20.2 | 7.81 | 24.88 |
| Koenig hardness after 3 days [sec] | 66 | 76 | 71 | 162 | 133 | 144 | 124 | 179 |

Table C shows examples of film compositions with or without the organo-functional polysiloxane of example 6 and the hardness measurements after 3 days of these films. These results show the Influence of the presence of a conventional polysiloxane and an aliphatic epoxy resin on the hardness development of these films. From this table it can be seen, that films comprising an organo-functional polysiloxane according to the invention (films II, III, IV, VI, VII, VIII) develop higher hardness than films without said organo-functional polysiloxane (films I and V). It can also be seen that high hardness development can be obtained without conventional polysiloxane (film VIII). The commercial aminopolysiloxane is Silres 44100 VP from Wacker.

The results of Tables A and B show that the organo-functional polysiloxanes according to the invention can form a cured film even without the presence of a catalyst. From Table C, it can be seen that with a catalyst like DBTL, the films according to the invention can cure much faster.

The films according to the Invention can cure to form coatings of suitable hardness according to the envisaged effect. As the hardness is not a requirement in every case, these results show that the organo-functional polysiloxanes according to the invention can be tailor-made to get a high or moderate hardness according to the application.

Example 9

Specific Examples of organo-functional polysiloxanes according to the invention are described hereunder in Table 1.

Examples of organo-functional polysiloxane according to the invention may contain units of formula (1') and (1"), in an alternating and/or in a random fashion, wherein the hydroxy and/or alkoxy group —$OR^9$ are replaced by 10–100% of —O—$R^{10}$, preferably by 20–100% of —O—$R^{10}$, most preferably by 30–100% of —O—$R^{10}$.

TABLE 1

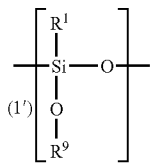

| $R^1$ | $R^9$ | $R^{10}$ |
|---|---|---|
| phenyl and/or $C_{1-8}$alkyl | H | 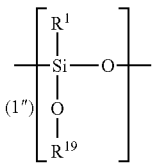 |
| phenyl and/or $C_{1-8}$alkyl | H | 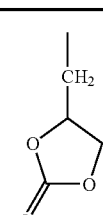 |

TABLE 1-continued
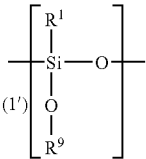
| R[1] | R[9] | R[10] |
|---|---|---|
| phenyl and/or $C_{1-8}$alkyl | H | 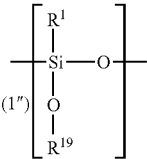 |
| phenyl and/or $C_{1-8}$alkyl | H | 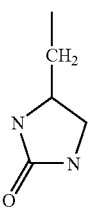 |
| phenyl and/or $C_{1-8}$alkyl | H | 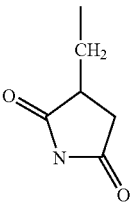 |
| phenyl and/or $C_{1-8}$alkyl | H | 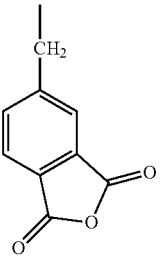 |
| phenyl and/or $C_{1-8}$alkyl | H | 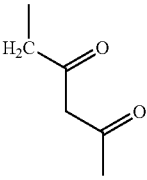 |
| phenyl and/or $C_{1-8}$alkyl | H | 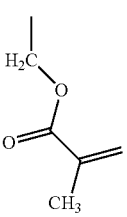 |
| phenyl and/or $C_{1-8}$alkyl | H | 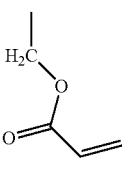 |

TABLE 1-continued
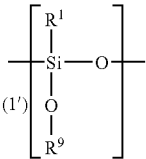 (1')      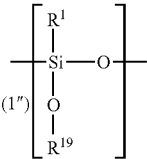 (1″)
| R¹ | R⁹ | R¹⁰ |
|---|---|---|
| phenyl and/or $C_{1-8}$alkyl | H | 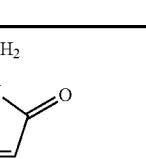 |
| phenyl and/or $C_{1-8}$alkyl | H |  |
| phenyl and/or $C_{1-8}$alkyl | H | 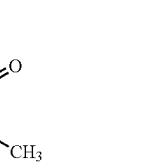 |
| phenyl and/or $C_{1-8}$alkyl | H |  |
| phenyl and/or $C_{1-8}$alkyl | H | 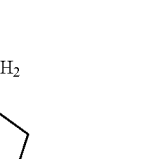<br>m = 0 to 10 |
| phenyl and/or $C_{1-8}$alkyl | H | <br>m = 0 to 10 |
| phenyl and/or $C_{1-8}$alkyl | H | 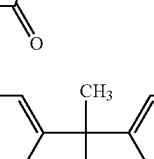<br>m = 0 to 10 |
| phenyl and/or $C_{1-8}$alkyl | H | <br>m = 0 to 10 |

TABLE 1-continued $$\left[\begin{array}{c} R^1 \\ | \\ Si-O \\ | \\ O \\ | \\ R^9 \end{array}\right] \text{(1')} \qquad \left[\begin{array}{c} R^1 \\ | \\ Si-O \\ | \\ O \\ | \\ R^{19} \end{array}\right] \text{(1'')}$$

| $R^1$ | $R^9$ | $R^{10}$ |
|---|---|---|
| phenyl and/or $C_{1-8}$alkyl | H | $-(CH_2-CH_2-CH_2-O-C_6H_4-C(CH_3)_2-C_6H_4-O-CH_2-CH(OH)-CH_2)_m-$ epoxide; m = 0 to 10 |
| phenyl and/or $C_{1-8}$alkyl | H | [phenoxypropyl / phenol novolac glycidyl ether structure]; m = 0 to 10 |
| phenyl and/or $C_{1-8}$alkyl | H | [phenoxypropyl / cresol novolac glycidyl ether structure with OH]; m = 0 to 10 |
| phenyl and/or $C_{1-8}$alkyl | H | [phenoxypropyl / novolac glycidyl ether structure with OH]; m = 0 to 10 |
| phenyl and/or $C_{1-8}$alkyl | H | [oxetane-containing group] |

TABLE 1-continued $$\left[\begin{array}{c} R^1 \\ | \\ Si-O \\ | \\ O \\ | \\ R^9 \end{array}\right] \quad (1') \qquad \left[\begin{array}{c} R^1 \\ | \\ Si-O \\ | \\ O \\ | \\ R^{19} \end{array}\right] \quad (1'')$$

| $R^1$ | $R^9$ | $R^{10}$ |
|---|---|---|
| phenyl and/or $C_{1-8}$alkyl | Me | CH₂–(1,3-dioxolan-2-one-4-yl) |
| phenyl and/or $C_{1-8}$alkyl | Me | CH₂–CH(NH–CO–CH₂–CO–CH₃) |
| phenyl and/or $C_{1-8}$alkyl | Me | CH₂–(imidazolidin-2-one-4-yl) |
| phenyl and/or $C_{1-8}$alkyl | Me | CH₂–(succinimid-3-yl) |
| phenyl and/or $C_{1-8}$alkyl | Me | CH₂–(phthalic anhydride-yl) |
| phenyl and/or $C_{1-8}$alkyl | Me | H₂C–CO–CH₂–CO–CH₃ |

TABLE 1-continued
| | | |
|---|---|---|
| 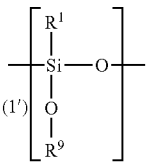 | | 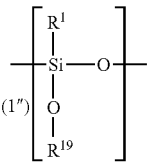 |
| R¹ | R⁹ | R¹⁰ |
|---|---|---|
| phenyl and/or C$_{1-8}$alkyl | Me | 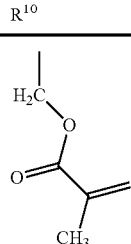 |
| phenyl and/or C$_{1-8}$alkyl | Me | 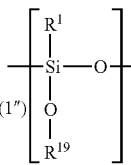 |
| phenyl and/or C$_{1-8}$alkyl | Me | 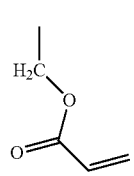 |
| phenyl and/or C$_{1-8}$alkyl | Me |  |
| phenyl and/or C$_{1-8}$alkyl | Me | 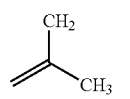 |
| phenyl and/or C$_{1-8}$alkyl | Me |  |
| phenyl and/or C$_{1-8}$alkyl | Me | 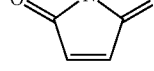 |
| phenyl and/or C$_{1-8}$alkyl | Me |  m = 0 to 10 |

TABLE 1-continued
| | | |
|---|---|---|
| $\begin{bmatrix} R^1 \\ | \\ Si-O \\ | \\ O \\ | \\ R^9 \end{bmatrix}$ (1') | | $\begin{bmatrix} R^1 \\ | \\ Si-O \\ | \\ O \\ | \\ R^{19} \end{bmatrix}$ (1'') |
| $R^1$ | $R^9$ | $R^{10}$ |
|---|---|---|
| phenyl and/or $C_{1-8}$alkyl | Me | 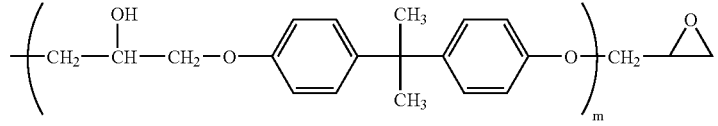 m = 0 to 10 |
| phenyl and/or $C_{1-8}$alkyl | Me |  m = 0 to 10 |
| phenyl and/or $C_{1-8}$alkyl | Me | 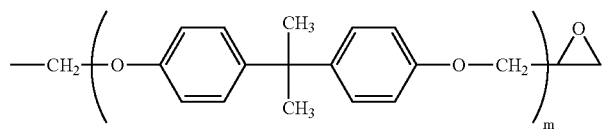 m = 0 to 10 |
| phenyl and/or $C_{1-8}$alkyl | Me | 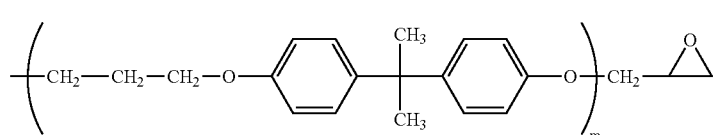 m = 0 to 10 |
| phenyl and/or $C_{1-8}$alkyl | Me | 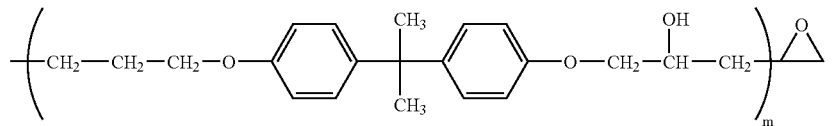 m = 0 to 10 |
| phenyl and/or $C_{1-8}$alkyl | Me | 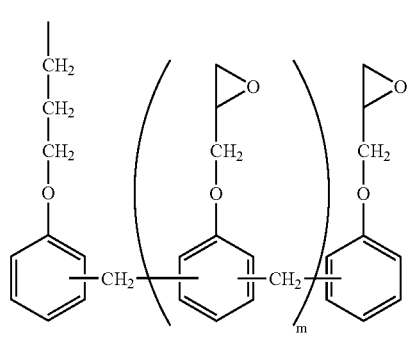 m = 0 to 10 |

TABLE 1-continued

| | | (1') | | | (1'') |
|---|---|---|---|---|---|

| R¹ | R⁹ | R¹⁰ |
|---|---|---|
| phenyl and/or $C_{1-8}$alkyl | Me | (structure: –CH₂CH₂CH₂–O–phenyl–CH₂–[phenyl(OCH₂-epoxide)–CH₂–phenyl(OH)–CH₂]ₘ–phenyl–O–CH₂-epoxide, m = 0 to 10) |
| phenyl and/or $C_{1-8}$alkyl | Me | (structure: –CH₂– attached to 3-ethyloxetane) |
| phenyl and/or $C_{1-8}$alkyl | Bu | (structure: –CH₂– attached to cyclic carbonate (1,3-dioxolan-2-one)) |
| phenyl and/or $C_{1-8}$alkyl | Bu | (structure: –CH₂–NH–C(=O)–CH₂–C(=O)–CH₃, acetoacetamide) |
| phenyl and/or $C_{1-8}$alkyl | Bu | (structure: –CH₂– attached to imidazolidin-2-one) |
| phenyl and/or $C_{1-8}$alkyl | Bu | (structure: –CH₂– attached to succinimide) |

TABLE 1-continued
$$\left[\begin{array}{c} R^1 \\ | \\ -Si-O- \\ | \\ O \\ | \\ R^9 \end{array}\right] (1')$$
$$\left[\begin{array}{c} R^1 \\ | \\ -Si-O- \\ | \\ O \\ | \\ R^{19} \end{array}\right] (1'')$$
| $R^1$ | $R^9$ | $R^{10}$ |
|---|---|---|
| phenyl and/or $C_{1-8}$alkyl | Bu | 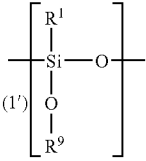 |
| phenyl and/or $C_{1-8}$alkyl | Bu | 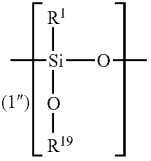 |
| phenyl and/or $C_{1-8}$alkyl | Bu | 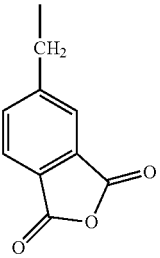 |
| phenyl and/or $C_{1-8}$alkyl | Bu | 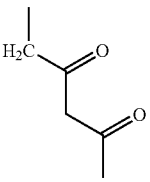 |
| phenyl and/or $C_{1-8}$alkyl | Bu | 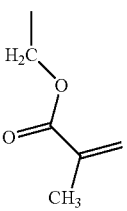 |
| phenyl and/or $C_{1-8}$alkyl | Bu | 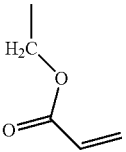 |
| phenyl and/or $C_{1-8}$alkyl | Bu | 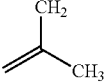 |

TABLE 1-continued $$\left[\begin{array}{c}R^1\\ -Si-O-\\ O\\ R^9\end{array}\right] (1')$$

$$\left[\begin{array}{c}R^1\\ -Si-O-\\ O\\ R^{19}\end{array}\right] (1'')$$

| $R^1$ | $R^9$ | $R^{10}$ |
|---|---|---|
| phenyl and/or $C_{1-8}$alkyl | Bu | 3-ethyl-dihydrofuran-2,5-dione substituent |
| phenyl and/or $C_{1-8}$alkyl | Bu | bisphenol A monoglycidyl ether |
| phenyl and/or $C_{1-8}$alkyl | Bu | bisphenol A diglycidyl ether oligomer, m = 0 to 10 |
| phenyl and/or $C_{1-8}$alkyl | Bu | hydroxy-containing bisphenol A glycidyl ether, m = 0 to 10 |
| phenyl and/or $C_{1-8}$alkyl | Bu | bisphenol A glycidyl ether (methylene linker), m = 0 to 10 |
| phenyl and/or $C_{1-8}$alkyl | Bu | bisphenol A glycidyl ether (propylene linker), m = 0 to 10 |
| phenyl and/or $C_{1-8}$alkyl | Bu | bisphenol A glycidyl ether with hydroxyl (propylene linker), m = 0 to 10 |

TABLE 1-continued $$\left[\begin{array}{c}R^1\\|\\-Si-O-\\|\\O\\|\\R^9\end{array}\right] \quad (1') \qquad \left[\begin{array}{c}R^1\\|\\-Si-O-\\|\\O\\|\\R^{19}\end{array}\right] \quad (1'')$$

| $R^1$ | $R^9$ | $R^{10}$ |
|---|---|---|
| phenyl and/or $C_{1-8}$alkyl | Bu | 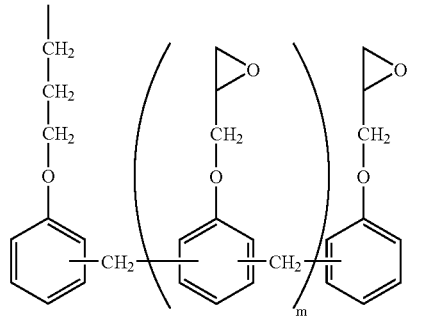 |
| phenyl and/or $C_{1-8}$alkyl | Bu |  |
| phenyl and/or $C_{1-8}$alkyl | Bu | 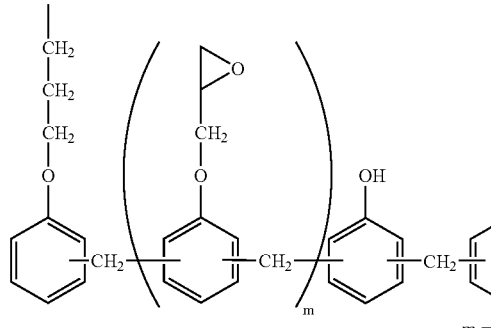 |
| phenyl and/or $C_{1-8}$alkyl | Bu | 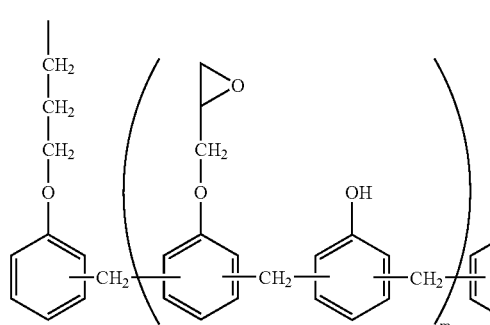 |

Although the organo-functional polysiloxane of the present invention have been described with considerable detail with reference to certain preferred variations thereof, other variations are possible. Therefore, the spirit and scope of the appended claims should not be limited to the preferred variations described herein.

What is claimed is:

1. An organo-functional polysiloxane of formula (1)

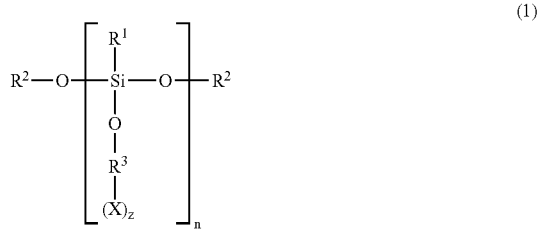

wherein each $R^1$ is independently selected from the group consisting of alkyl and aryl radicals, each $R^2$ is independently selected from the group consisting of hydrogen, alkyl and aryl radicals, n is selected so that the molecular weight for the organo-functional polysiloxane is in the range of from 400 to 10,000, $R^3$ is a bivalent radical or —O—$R^3$—$(X)_z$ is hydroxy or alkoxy, z is 1, 2 or 3 and X is a reactive functional group for reacting with amine radicals and wherein 0 to 90% of —O—$R^3$—$(X)_z$ is hydroxy or alkoxy.

2. The organo-functional polysiloxane of formula (1) according to claim 1, having the following stoichiometric formula

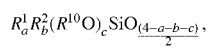

wherein each $R^1$ is independently selected from the group consisting of alkyl and aryl radicals, each $R^2$ is independently selected from the group consisting of hydrogen, alkyl and aryl radicals, each $R^{10}$ is independently selected from hydrogen, alkyl, or —$R^3$—$(X)_z$, a and b are each a real number from 0.0 to 2.0, c is a real number from 0.1 to 1.0, b/a is ranging from 0.2–2.0 and a+b+c is lower than 4, wherein $R^3$ is a bivalent radical, z is 1, 2 or 3 and X is a reactive functional group for reacting with amine radical, and wherein 0 to 90% of —O—$R^{10}$ is hydroxy or alkoxy.

3. The organo-functional polysiloxane according to claim 2, wherein a and b are each a real number from 0.1 to 2.0.

4. The organo-functional polysiloxane according to claim 1, wherein $R^3$ is selected from the group consisting of alkylene, alkenylene, arylene, aralkylene, aralkenylene, aryloxy, aminoalkylene, —C(=O)—, —C(=S)—, —S(=O)$_2$—, alkylene-C(=O)—, alkylene-C(=S)—, alkylene-S(=O)$_2$—, —NR$^4$—C(=O)—, —NR$^4$-alkylene-C(=O)—, or —NR$^4$—S(=O)$_2$ whereby either the C(=O) group or the S(=O)$_2$ group is attached to the NR$^4$ moiety, wherein R$^4$ is hydrogen, alkyl, alkenyl, aralkyl, cycloalkyl, cycloalkylalkyl, aryl, heterocycle or heterocycloalkyl; or the radical —O—R$^3$—$(X)_z$ can be selected from the group consisting of hydroxy, alkoxy or radical of formula (I), (II), (III), (IV), (V), (VI), (VII), (VIII), (IX)

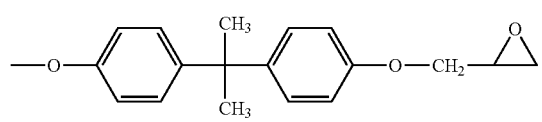

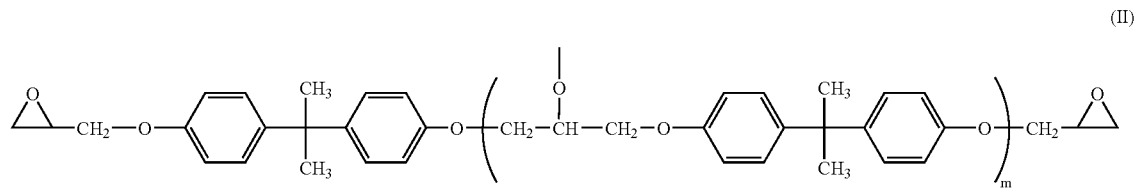

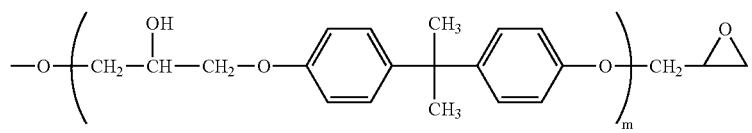

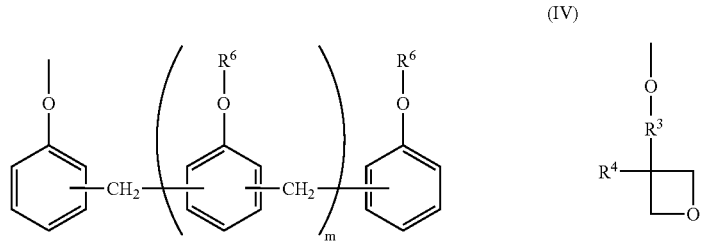

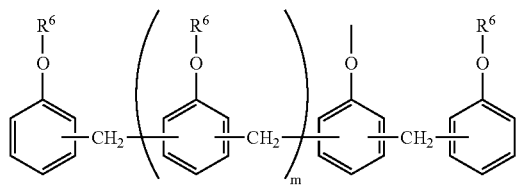

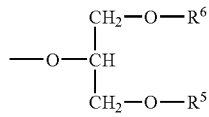

wherein $R^6$ is H or

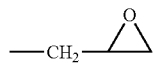

and m is an integer from 0 to 10.

5. The organo-functional polysiloxane according to claim 4, wherein $R^3$ is further substituted by one or more radicals selected from the group consisting of alkyl, aryl, cycloalkyl, halogen, hydroxy, alkoxy, thioalkyl, amino, amino derivatives, amido, amidoxy, nitro, cyano, keto, acyl derivatives, acyloxy derivatives, carboxy, ester, ether, esteroxy, sulfonic acid, sulfonyl derivatives, sulfinyl derivatives, heterocycle, alkenyl or alkynyl.

6. The organo-functional polysiloxane according to claim 1, wherein X is selected from the group consisting of unsaturated ester, imidyl, phthalimidyl, cyclocarbonate, acetylalkanoate, acetylalkylamide, epoxy, cyclic anhydride, carbamate, isocyanate, vinyl, and oxetane.

7. The organo-functional polysiloxane according to claim 1, wherein X is selected from the group consisting of acrylate, methacrylate, maleimide, succinimide, glycerolcarbonate, acetylacetanoate, epoxy, (cyclic)succinic anhydride, phthalic anhydride, isocyanate, oxetane, and vinyl.

8. The organo-functional polysiloxane according to claim 1, wherein the functional group $—R^3—(X)_z$ is selected from the group consisting of acrylate, methacrylate, maleimide, succinimide, glycerolcarbonate, acetylacetanoate, cyclic succinic anhydride, and phthalic anhydride.

9. The organo-functional polysiloxane according to claim 1, having the following formulas (a), (b), (c), (d), (e), (f), (g), (h), (i), (j), (k), (l), or (m)

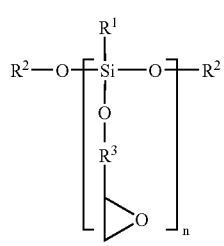

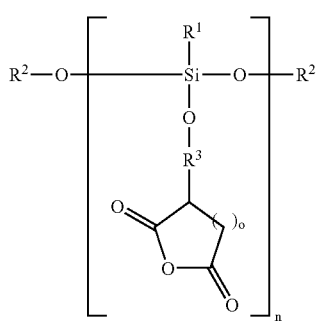

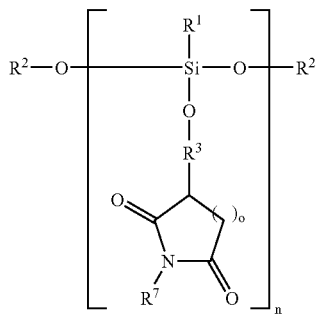

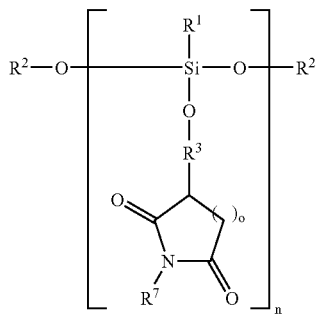

-continued

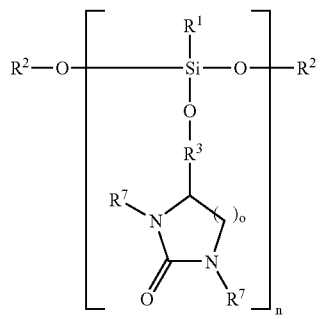
(e)

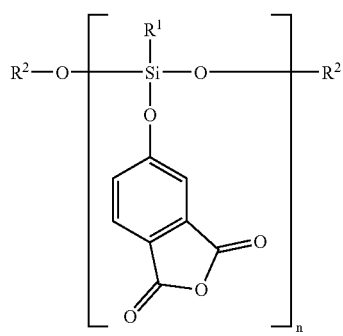
(f)

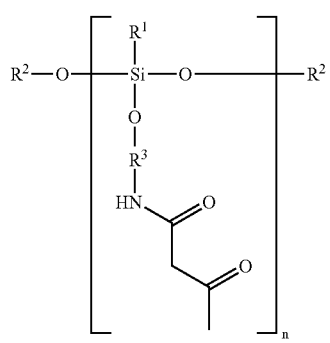
(g)

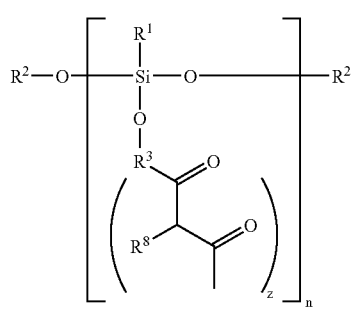
(h)

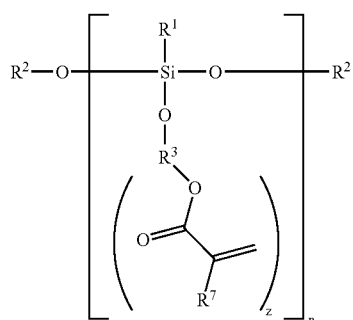
(i)

-continued

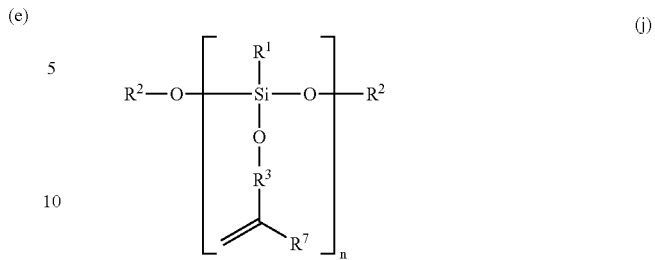
(j)

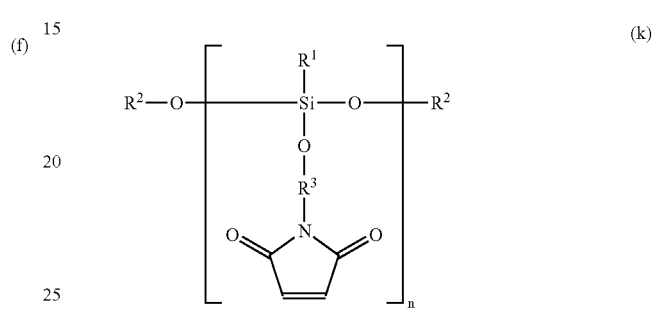
(k)

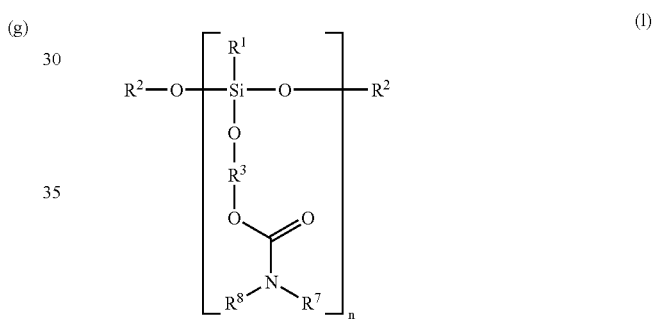
(l)

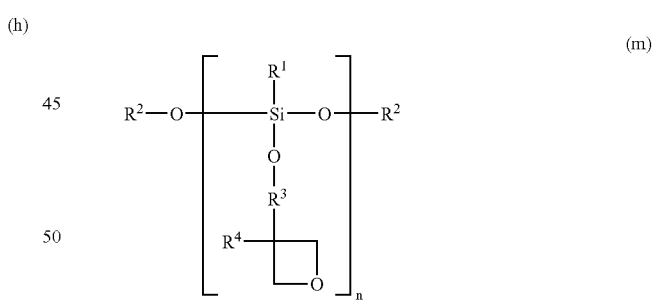
(m)

wherein $R^1$, $R^2$, $R^3$ and n have the same meaning as that defined above, $R^7$, $R^8$, $R^4$ represent each independently a hydrogen, alkyl, alkenyl, aralkyl, cycloalkyl, cycloalkylalkyl, aryl, heterocycle or heterocycloalkyl, z is 1, 2 or 3 and o is 1, 2 or 3.

10. The organo-functional polysiloxane according to claim 1 as listed in Table 1.

11. A method for the preparation of organo-functional polysiloxane of formula (1) according to claim 1, comprising the step of reacting a polysiloxane of formula (2) with a compound of formula (3),

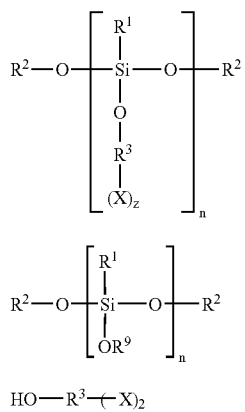

(1)

(2)

(3)

wherein each $R^1$ is independently selected from the group consisting of alkyl and aryl radicals, $R^2$ and $R^9$ which may be identical or different, are selected each independently from the group consisting of hydrogen, alkyl and aryl radicals, n is selected so that the molecular weight for the organo-functional polysiloxane is in the range of from 400 to 10,000, $R^3$ is a bivalent radical or —O—$R^3$—$(X)_z$ in compound of formula (1) is hydroxy or alkoxy, z is 1, 2 or 3 and X is a reactive functional group for reacting with amine radicals and wherein 0 to 90% of —O—$R^3$—$(X)_z$ is hydroxy or alkoxy.

12. The method according to claim 11, wherein the polysiloxane of formula (1) has the following stoichiometric formula

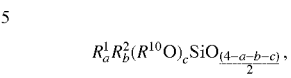

wherein each $R^{10}$ is independently selected from hydrogen, alkyl, or —$R^3$—$(X)_z$, and $R^1$, $R^2$, $R^3$, X, and z have the same meaning as that defined above, a and b are each a real number from 0.0 to 2.0, c is a real number from 0.1 to 1.0, b/a is ranging from 0.2–2.0 and a+b+c is lower than 4, and wherein 0 to 90% of —O—$R^{10}$ is hydroxy or alkoxy.

13. The method according to claim 12, wherein a and b are each a real number from 0.1 to 2.0.

14. The method according to claim 11, wherein $R^3$ is selected from the group consisting of alkylene, alkenylene, arylene, aralkylene, aralkenylene, aryloxy, aminoalkylene, —C(=O)—, —C(=S)—, —S(=O)$_2$—, alkylene-C(=O)—, alkylene-C(=S)—, alkylene-S(=O)$_2$—, —NR$^4$—C(=O)—, —NR$^4$-alkylene-C(=O)—, or —NR$^4$—S(=O)$_2$ whereby either the C(=O) group or the S(=O)$_2$ group is attached to the NR$^4$ moiety, wherein $R^4$ is hydrogen, alkyl, alkenyl, aralkyl, cycloalkyl, cycloalkylalkyl, aryl, heterocycle or heterocycloalkyl; or the radical —O—R$^3$—$(X)_z$ can be selected from the group consisting of radical of formula (I), (II), (III), (IV), (V), (VI), (VII), (VIII), and (IX)

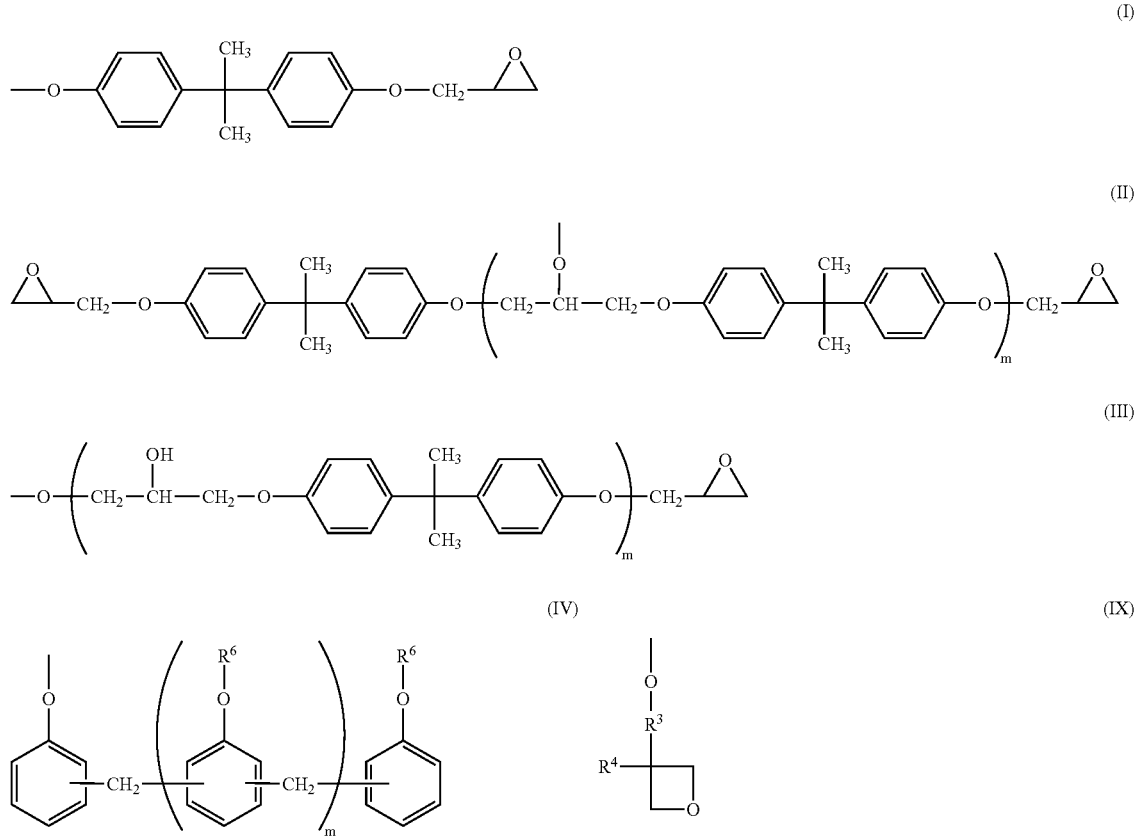

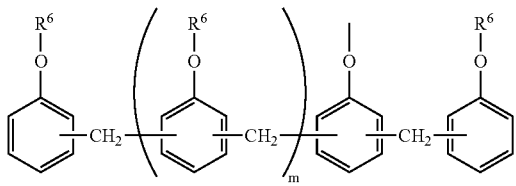
(V)

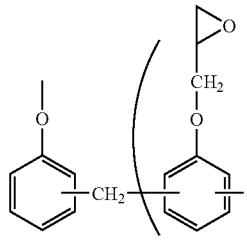
(VI)

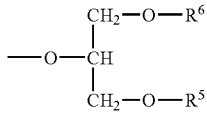
(VII)

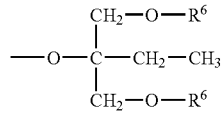
(VIII)

wherein $R^6$ is H or

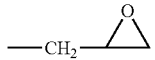

and m is an integer from 0 to 10.

15. The organo-functional polysiloxane according to claim 14, wherein $R^3$ is further substituted by one or more radicals selected from the group consisting of alkyl, aryl, cycloalkyl, halogen, hydroxy, alkoxy, thioalkyl, amino, amino derivatives, amido, amidoxy, nitro, cyano, keto, acyl derivatives, acyloxy derivatives, carboxy, ester, ether, esteroxy, sulfonic acid, sulfonyl derivatives, sulfinyl derivatives, heterocycle, alkenyl and alkynyl.

16. The method according to claim 11 wherein X is selected from the group consisting of unsaturated ester, imidyl, phthalimidyl, cyclocarbonate, acetylalkanoate, acetylalkylamide, epoxy, cyclic anhydride, carbamate, isocyanate, vinyl, and oxetane.

17. The method according to claim 11, wherein X is selected from the group consisting of acrylate, methacrylate, maleimide, succinimide, glycerolcarbonate, acetylacetanoate, epoxy, (cyclic)succinic anhydride, phthalic anhydride, isocyanate, oxetane, and vinyl.

18. The method according to claim 17, wherein the polysiloxane of formula (2) has a molecular weight ranging from 500 to 6000.

19. The method according to claim 11, wherein the polysiloxane of formula (2) has the following stoichiometric formula

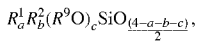

wherein $R^1$, $R^2$, $R^9$ have the same meaning as that defined above, a and b are each a real number from 0.0 to 2.0, c is a real number from 0.1 to 1.0, and a+b+c is lower than 4.

20. Method according to claim 19, wherein the polysiloxane of formula (2) has an alkoxy content ranging from 10 to 50%.

21. The method according to claim 19, wherein the polysiloxane of formula (2) is selected from the group consisting of alkoxy-functional polysiloxane and silanol-functional polysiloxane.

22. The method according to claim 11, wherein compound of formula (3) is selected from the group consisting of compounds of formulas (a'), (b'), (c'), (d'), (e'), (f'), (g'), (h'), (i'), (j'), (k'), (l'), (I'), (II'), (III'), (IV'), (V'), (VI'), (VII'), (VIII'), and (IX'):

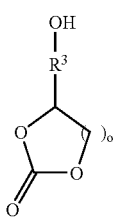
(b')

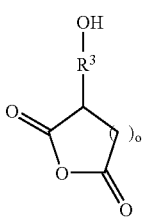
(c')

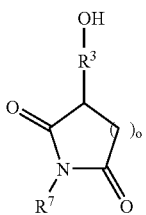
(d')

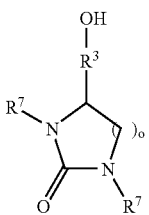
(e')

-continued
(f') 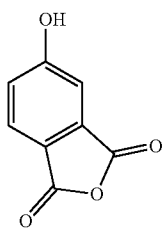
(g') 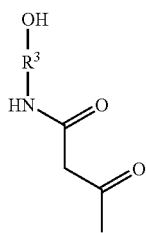
(h') 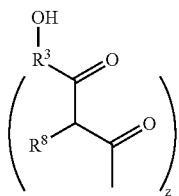
(i') 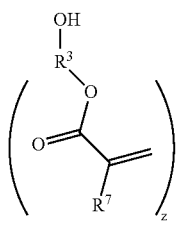
(j') 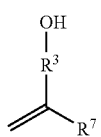
(k') 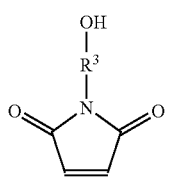
(l') 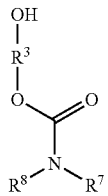
(I') 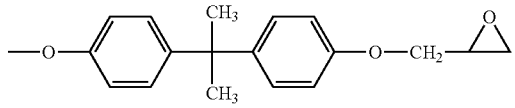
(II') 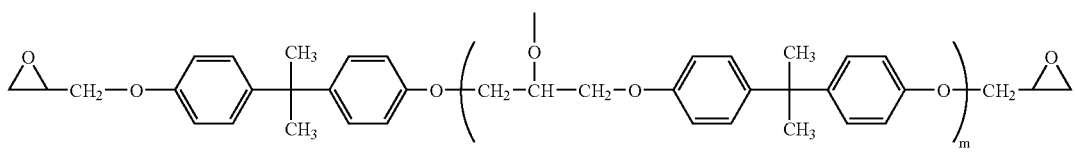
(III') 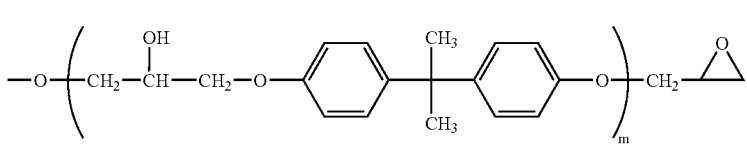
(IV') 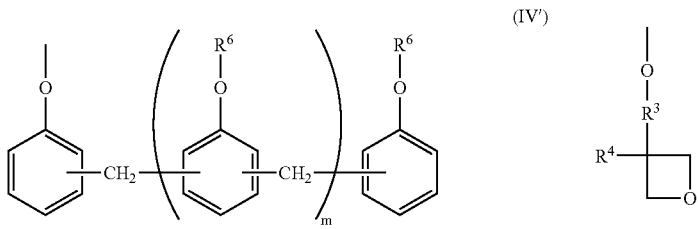
(IX') 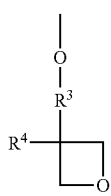

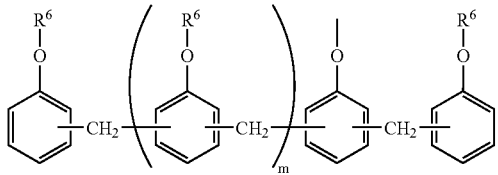 (V')

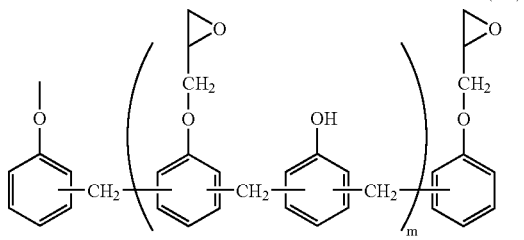 (VI')

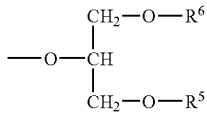 (VII')

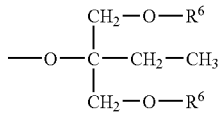 (VIII')

wherein $R^3$ has the same meaning as that defined above, wherein $R^6$ is hydrogen or

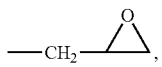, m is an integer of 0 to 10, $R^7$, $R^8$, $R^4$ represent each independently a hydrogen, alkyl, alkenyl, aralkyl, cycloalkyl, cycloalkylalkyl, aryl, heterocycle or heterocycloalkyl, and o is 1, 2 or 3.

23. The method according to claim 11, wherein the compound of formula (3) is selected from the group consisting of glycerin carbonate, trimethylolpropane oxetane (TMPO), hydroxyethylacrylate, hydroxyethylmethacrylate, diglycidyl ethers of bisphenol a and bisphenol a based epoxy resins, epoxidized phenol, formaldehyde resins, phenol novolak resins, glycidyl ethers of trimethylpropane (TMP), glycidyl ethers of neopentyl glycol (NPG) and glycidyl ethers of glycerol.

24. The method according to claim 11, wherein the step of reacting a polysiloxane of formula (2) with a compound of formula (3) is performed in the presence of a suitable catalyst.

25. A coating composition comprising an organo-functional polysiloxane according to claim 1 and an amino-hardener.

26. The coating composition according to claim 25, wherein the organo-functional polysiloxane is ranging from 40 to 80% by weight and the amino-hardener is ranging from 20 to 60% by weight.

27. The coating composition according to claim 25, wherein said amino-hardener is a polyamine.

28. The coating composition according to claim 27, wherein said polyamine is a polyoxyalkylenepolyamine hardener.

29. The coating composition according to claim 28, wherein said polyoxyalkylenepolyamine is a polyoxypropylenetriamine.

30. A method of using the coating composition of claim 25 comprising applying a composition comprising the coating composition of claim 25 onto a substrate.

31. The coating composition according to claim 29, wherein said polyoxypropylenetriamine is selected from the group consisting of polyoxypropylene triamine and polyoxypropylene diamine.

32. A method for the preparation of a coating composition comprising an organo-functional polysiloxane according to claim 1 and an amino-hardener comprising the step of mixing the organo-functional polysiloxane with the amino-hardener.

33. The method of claim 32, wherein the mixing of the the organo-functional polysiloxane with the amino-hardener is performed in the presence of a catalyst.

34. An organo-functional polysiloxane polymer composition obtainable by combining the following ingredients:
an organo-functional polysiloxane according to claim 1, with
a sufficient amount of an amino hardener component having active hydrogens able to react with the reactive functional groups of the organo-functional polysiloxane to form a polymer network.

35. The organo-functional polysiloxane polymer composition according to claim 34 further comprising an epoxy resin having more than one 1,2-epoxy groups per molecule with an epoxy equivalent weight in the range of from 100 to about 5,000.

36. The organo-functional polysiloxane polymer composition according to claim 34 further comprising a polysiloxane.

37. A coating method which comprises applying a coating composition comprising the organo-functional polysiloxane of claim 1 onto a substrate.

38. The method of claim 37, wherein applying is by brushing, spraying or dipping.

39. The method of claim 37, wherein the substrate is selected from the group consisting of textiles, plastics, glass, ceramic, concrete, fiberboard, artificial stones, and metal.

40. The method of claim 39, wherein the metal is selected from the group consisting of pretreated sheet steel, cast iron, aluminum, and nonferrous metals.

41. The method of claim 40, wherein the nonferrous metal is selected from the group consisting of brass, bronze and copper.

42. The method of claim 37, wherein the composition is a paint formulation.

43. A method of producing a shaped article comprising casting a resin comprising the organo-functional polysiloxane of claim 1 into the shaped article.

* * * * *

UNITED STATES PATENT AND TRADEMARK OFFICE
CERTIFICATE OF CORRECTION

PATENT NO. : 7,118,621 B2
APPLICATION NO. : 10/512903
DATED : October 10, 2006
INVENTOR(S) : Gerritsen et al.

It is certified that error appears in the above-identified patent and that said Letters Patent is hereby corrected as shown below:

First Page, (57) Abstract, Next to and Last Line, "—O—$R_3$—$(X)_z$" should be changed to -- —O—$R^3$—$(X)_z$--

First Page, (57) Abstract, Last Line, "or alkoxy" should be changed to --or alkoxy.--

Column 2, Line 30, "and $R^1$, $R_2$, $R_3$, X and z" should be changed to --and $R^1$, $R^2$, $R^3$, X and z--

Column 3, Lines 23-24, " "Independently selected" Indicates" should be change to -- "independently selected" indicates--

Column 4, Line 44, "4hydroxyphenyl" should be changed to --4-hydroxyphenyl--

Column 4, Line 52, "In combination" should be changed to --in combination --

Column 7, Structure (VII), " 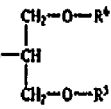 " should be changed to -- 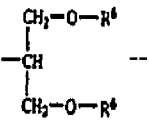 --

Column 7, Lines 36-37, "organofunctional" should be changed to --organo-functional--

Column 11, Line 41, "—O—$R_3$—$(X)_z$" should be changed to -- —O—$R^3$—$(X)_z$--

Column 12, Line 10, "truisopropoxide" should be changed to --triisopropoxide--

Column 12, Line 34, "DC3037" should be changed to --DC-3037--

Column 15, Structure (VII') " 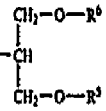 " should be changed to -- 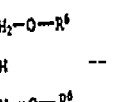 --

Column 16, Structure (IX'), " 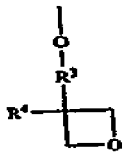 " should be changed to -- 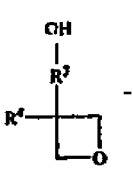 --

Column 16, Line 57, "to the Invention," should be changed to --to the invention--

UNITED STATES PATENT AND TRADEMARK OFFICE
CERTIFICATE OF CORRECTION

PATENT NO.       : 7,118,621 B2
APPLICATION NO.  : 10/512903
DATED            : October 10, 2006
INVENTOR(S)      : Gerritsen et al.

It is certified that error appears in the above-identified patent and that said Letters Patent is hereby corrected as shown below:

Column 17, Line 38, "1,3diaminopentane" should be changed to --1,3-diaminopentane--

Column 17, Lines 48, "[5.2.1.0$^{2.6}$]de-" should be changed to --[5.2.1.0$^{2,6}$]de--

Column 17, Line 54, "bicyclo[2.2.1]hept-2-yl]" should be changed to

--bicyclo[[2.2.1]hept-2-yl]--

Column 19, Line 5, "employed Individually" should be changed to --employed individually--

Column 20, Line 10, "dodecyidiphenyloxide" should be changed to

--dodecyldiphenyloxide--

Column 20, Line 66, "Rüftapox VE4261/R" should be changed to --Rütapox

VE4261/R--

Column 21, Structure (5), " $R^1-O-\underset{\underset{R^{1\prime\prime}}{|}}{\overset{\overset{R^{1\prime}}{|}}{Si}}-O-R^2$ " should be changed to -- $R^1-O-\underset{\underset{R^{1\prime\prime}}{|}}{\overset{\overset{R^{1\prime}}{|}}{Si}}-O-R^2$ --

Column 24, Line 6, "333.2 of polysiloxane" should be changed to --333.2 g of polysiloxane--

Column 24, Line 40, "to the Invention cured" should be changed to --to the invention cured--

Column 25, Line 20, "show the Influence" should be changed to --show the influence--

Column 26, Line 17, "according to the Invention" should be changed to --according to the invention--

UNITED STATES PATENT AND TRADEMARK OFFICE
CERTIFICATE OF CORRECTION

PATENT NO.       : 7,118,621 B2
APPLICATION NO.  : 10/512903
DATED            : October 10, 2006
INVENTOR(S)      : Gerritsen et al.

It is certified that error appears in the above-identified patent and that said Letters Patent is hereby corrected as shown below:

Column 26, Table 1, Structure (1"), and

Column 28, 26, 28, 30, 32, 34, 36, 38, 40, 42, 44 and 46 Table 1-continued, Structure (1"), " 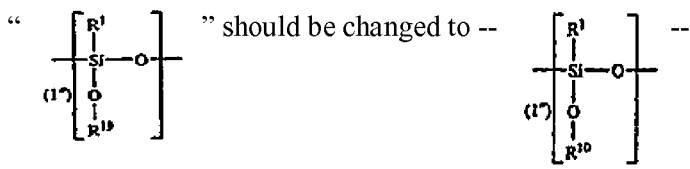 should be changed to --

Column 47, Lines 18-19, "—O—$R_3$—$(X)_z$" should be changed to

-- 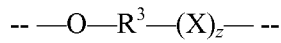 --

Column 49, Structure (VII) " 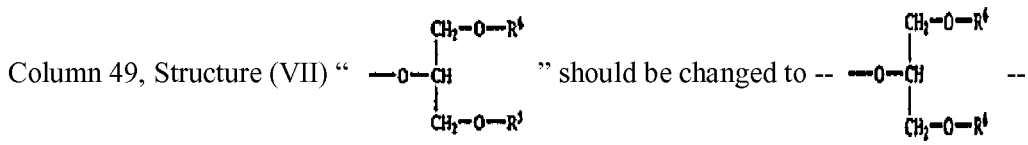

Column 53, Structure (3), " HO—$R^3$—$(X)_z$ " should be changed to -- HO—$R^3$—$(X)_z$ --

Column 54, Line 25, "—$NR_4$—S(==O)$_2$" should be changed to --"—$NR^4$—S(==O)$_2$ --

Column 54, Line 29, "—O—$R_3$—$(X)_z$" should be changed to -- "—O—$R^3$—$(X)_z$ --

Column 55, Structure (VII) " 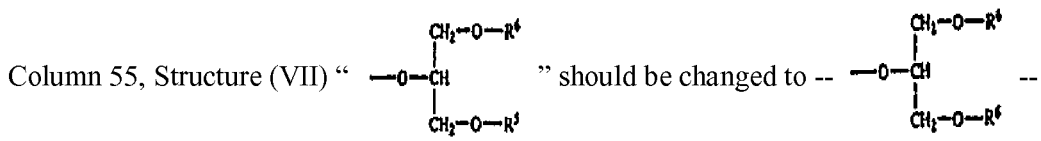

Column 58, Structure (I'), " 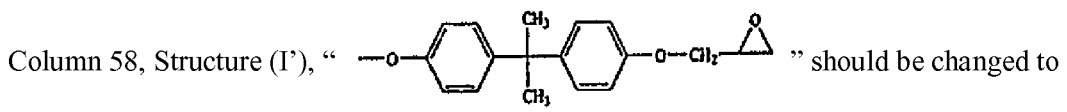 " should be changed to

-- 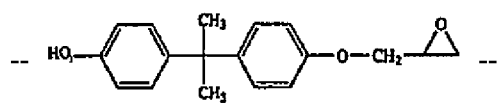 --

UNITED STATES PATENT AND TRADEMARK OFFICE
CERTIFICATE OF CORRECTION

PATENT NO. : 7,118,621 B2
APPLICATION NO. : 10/512903
DATED : October 10, 2006
INVENTOR(S) : Gerritsen et al.

It is certified that error appears in the above-identified patent and that said Letters Patent is hereby corrected as shown below:

Columns 57-58, Structure (II')

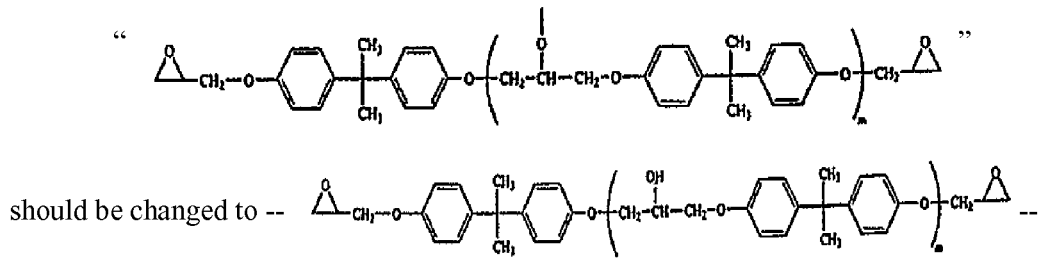

Columns 57-58, Structure (III')

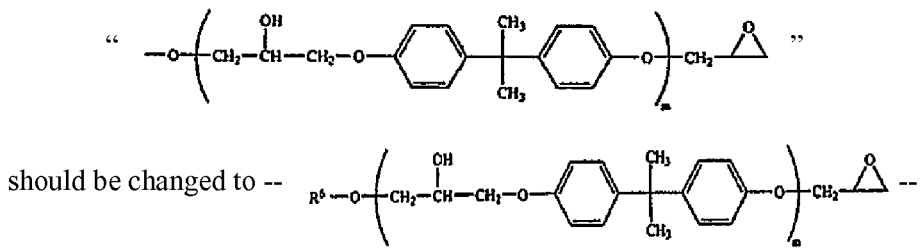

Column 57, Structure (IV'), "

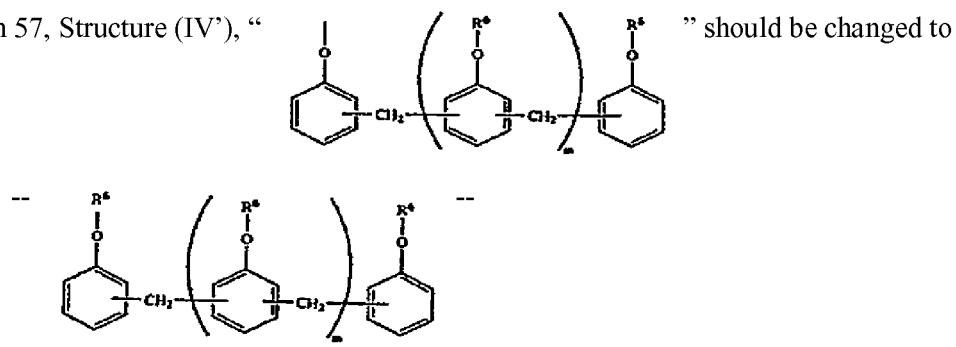

Column 58, Structure (IX') "

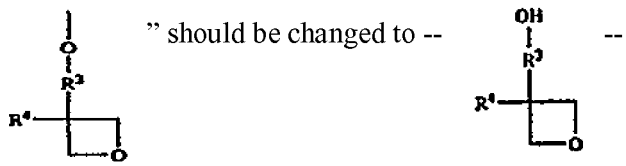

UNITED STATES PATENT AND TRADEMARK OFFICE
CERTIFICATE OF CORRECTION

PATENT NO. : 7,118,621 B2
APPLICATION NO. : 10/512903
DATED : October 10, 2006
INVENTOR(S) : Gerritsen et al.

It is certified that error appears in the above-identified patent and that said Letters Patent is hereby corrected as shown below:

Column 59, Structure (V'), " 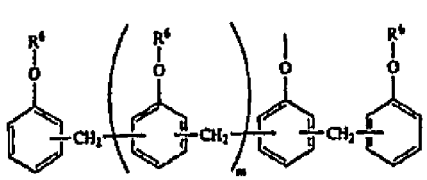 " should be changed to -- 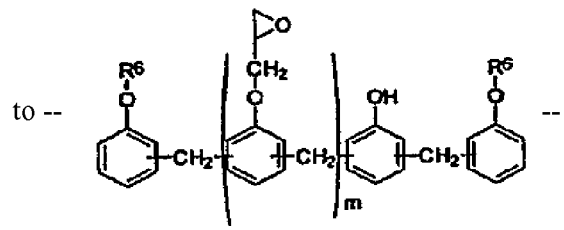 --

Column 59, Structure (VII') " 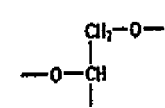 " should be changed to

-- 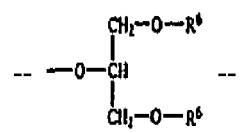 --

Column 59, Line 37, "ethers of bisphenol a and bisphenol a based" should be changed to --ethers of bisphenol A and bisphenol A based--

Column 60, Structure (VI')," 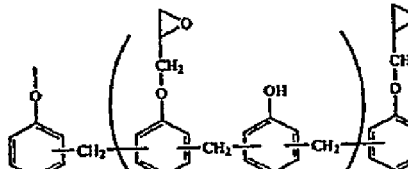 " should be changed to -- 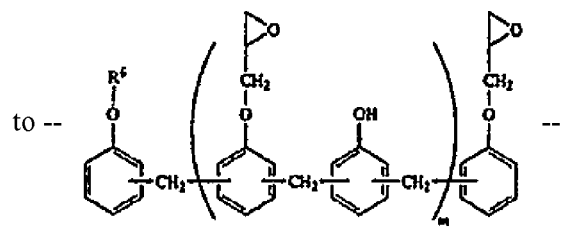 --

UNITED STATES PATENT AND TRADEMARK OFFICE
CERTIFICATE OF CORRECTION

PATENT NO. : 7,118,621 B2
APPLICATION NO. : 10/512903
DATED : October 10, 2006
INVENTOR(S) : Gerritsen et al.

It is certified that error appears in the above-identified patent and that said Letters Patent is hereby corrected as shown below:

Column 60, Line 23, "an amino-hardener" should be changed to --an amino-hardener,--

Column 60, Line 26, "mixing of the the" should be changed to --mixing of the--

Signed and Sealed this

Twenty-fourth Day of April, 2007

JON W. DUDAS
*Director of the United States Patent and Trademark Office*